United States Patent
Hull et al.

(10) Patent No.: US 10,158,401 B2
(45) Date of Patent: Dec. 18, 2018

(54) INTELLIGENT NETWORK SENSOR SYSTEM

(71) Applicants: Jonathan J. Hull, Menlo Park, CA (US); Ken Gudan, Menlo Park, CA (US); Harsha Binnamangalam, Menlo Park, CA (US)

(72) Inventors: Jonathan J. Hull, Menlo Park, CA (US); Ken Gudan, Menlo Park, CA (US); Harsha Binnamangalam, Menlo Park, CA (US)

(73) Assignee: RICOH CO., LTD., Tokyo (JP)

( * ) Notice: Subject to any disclaimer, the term of this patent is extended or adjusted under 35 U.S.C. 154(b) by 0 days.

(21) Appl. No.: 14/634,467

(22) Filed: Feb. 27, 2015

(65) Prior Publication Data
US 2016/0254844 A1  Sep. 1, 2016

(51) Int. Cl.
*H04B 5/00* (2006.01)
*H04W 52/02* (2009.01)

(52) U.S. Cl.
CPC ......... *H04B 5/0062* (2013.01); *H04B 5/0037* (2013.01); *H04W 52/0229* (2013.01); *H04W 52/0296* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y02D 70/168* (2018.01); *Y02D 70/42* (2018.01)

(58) Field of Classification Search
CPC .. G08B 7/06; G06K 7/10217; G06K 7/10316; G06K 7/10326; G06K 7/10336; G06K 7/10346; G06K 7/10356; G06K 7/0008; H04B 5/0068; H04B 5/0056; H04B 5/0037; H04W 52/0229
USPC .... 340/6.1, 10.1, 10.3; 455/574, 127, 343.1, 455/343.5
See application file for complete search history.

(56) References Cited

U.S. PATENT DOCUMENTS

| | | | |
|---|---|---|---|
| 2004/0046016 A1* | 3/2004 | Becker | G06K 7/0008 235/380 |
| 2006/0038658 A1* | 2/2006 | Jarvis | G06K 19/0701 340/10.1 |
| 2008/0024375 A1* | 1/2008 | Martin | H01Q 1/241 343/718 |
| 2009/0174263 A1* | 7/2009 | Baarman | H02J 5/005 307/104 |

(Continued)

*Primary Examiner* — Omar Casillashernandez
(74) *Attorney, Agent, or Firm* — Womble Bond Dickinson (US) LLP

(57) ABSTRACT

A network sensor system and method for using the same are disclosed herein. In one embodiment, the network sensor system comprises: a radio-frequency (RF) emitter; a first sensor tag including a transmitter, an energy harvesting unit operable to convert incident RF energy to direct current (DC) including RF energy from the RF emitter and RF energy from one or more ambient sources, a storage unit operable to store recovered DC power, one or more sensors for sensing and logging data, a controller coupled to the energy harvesting and storage units, the one or more sensors and the transmitter, to communicate data in the form of a Bluetooth Low Energy (BLE) advertising packet using energy previously harvested and stored by the energy harvesting and storage unit; and a first device to receive the BLE advertising packet.

16 Claims, 13 Drawing Sheets

(56) References Cited

U.S. PATENT DOCUMENTS

| | | | | |
|---|---|---|---|---|
| 2010/0019883 A1* | 1/2010 | Eom | ................... | G06K 7/0008 |
| | | | | 340/10.1 |
| 2010/0066505 A1* | 3/2010 | Shiotsu | .............. | G06K 7/10029 |
| | | | | 340/10.3 |
| 2013/0265140 A1* | 10/2013 | Gudan | ............... | G06K 7/10207 |
| | | | | 340/10.3 |
| 2013/0335200 A1* | 12/2013 | Jonely | ................ | G06K 7/10128 |
| | | | | 340/10.5 |
| 2016/0196455 A1* | 7/2016 | Gudan | ................ | H04B 5/0062 |
| | | | | 340/10.5 |

* cited by examiner

```
emitter_control() {
    repeat
        F ≈ search(fs, fe, step, Fex);
        S = select(F)
        sweep(S)
    until ();
}
```

INTELLIGENT NETWORK SENSOR SYSTEM

PRIORITY

The present patent application claims priority to and incorporates by reference the corresponding provisional patent application Ser. No. 62/059,462, titled, "Intelligent Network Sensor System" filed on Oct. 3, 2014.

FIELD OF THE INVENTION

Embodiments of the present invention relate to the field of wireless power transfer; more particularly, embodiments of the present invention relate to radio-frequency (RF) energy harvesting devices that harvest ambient RF energy and store the received RF energy.

BACKGROUND OF THE INVENTION

Radio-Frequency (RF) power harvesting techniques have been applied widely for providing long term power supply of low energy consumption and battery-less devices. It is an essential component of passive RFID systems. Recently, there has also been a strong interest in implementing wireless power harvesting techniques with sensor technology for monitoring various environmental conditions such as temperature, pressure, humidity and human health conditions.

Providing power to wireless sensors is typically addressed with onboard batteries. This is acceptable for small scale deployments where a handful of sensors can be regularly serviced by a technician. However, for large commercial applications in retail stores, for which there might be hundreds of sensors per location, this maintenance quickly becomes untenable.

Next generation sensor networks may be powered by energy harvesting techniques to avoid requiring battery maintenance. Energy harvesting is a process by which energy is derived from external sources (e.g., radio frequency energy, solar power, thermal energy, wind energy, salinity gradients, or kinetic energy), captured and stored.

Energy may be harvested from radio frequency signals propagating wirelessly. With RF harvesting, wireless energy comes from a radio frequency transmitting device that is some distance away from a device that harvests energy from the radio frequency transmission. Properties of an energy harvester include its ability to harvest energy efficiently from available RF signals, its ability to store the harvested energy efficiently with minimal storage loss, and its ability to make the stored energy available to meet the voltage, current, and duty cycle requirements of a desired application.

One of the more popular forms of RF used today is Wi-Fi (also referred to as IEEE 802.11a/b/g/n etc.) communications. Today, most Wi-Fi communications are in the 2.4 GHz and 5.8 GHz frequency bands and there are many local area networks that are based on Wi-Fi in which access points enable Wi-Fi clients to gain access to networks such as the Internet. Furthermore, the 2.4 GHz and 5.8 GHz bands also support other networking standards, such as Zigbee and Bluetooth, and other proprietary networks, each transmitting energy by communicating in this same frequency band.

Recent work has shown that Wi-Fi energy is abundant in a typical office environment, although at low power levels, e.g. yielding below −20 dBm at the feedpoint of a half-wavelength, 6 dBi gain patch antenna. Harvesting energy from ambient Wi-Fi has been the subject of several recent investigations.

SUMMARY OF THE INVENTION

A network sensor system and method for using the same are disclosed herein. In one embodiment, the network sensor system comprises: a radio-frequency (RF) emitter; a first sensor tag including a transmitter, an energy harvesting unit operable to convert incident RF energy to direct current (DC) including RF energy from the RF emitter and RF energy from one or more ambient sources, a storage unit operable to store recovered DC power, one or more sensors for sensing and logging data, a controller coupled to the energy harvesting and storage units, the one or more sensors and the transmitter, to communicate data in the form of a Bluetooth Low Energy (BLE) advertising packet using energy previously harvested and stored by the energy harvesting and storage unit; and a first device to receive the BLE advertising packet.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
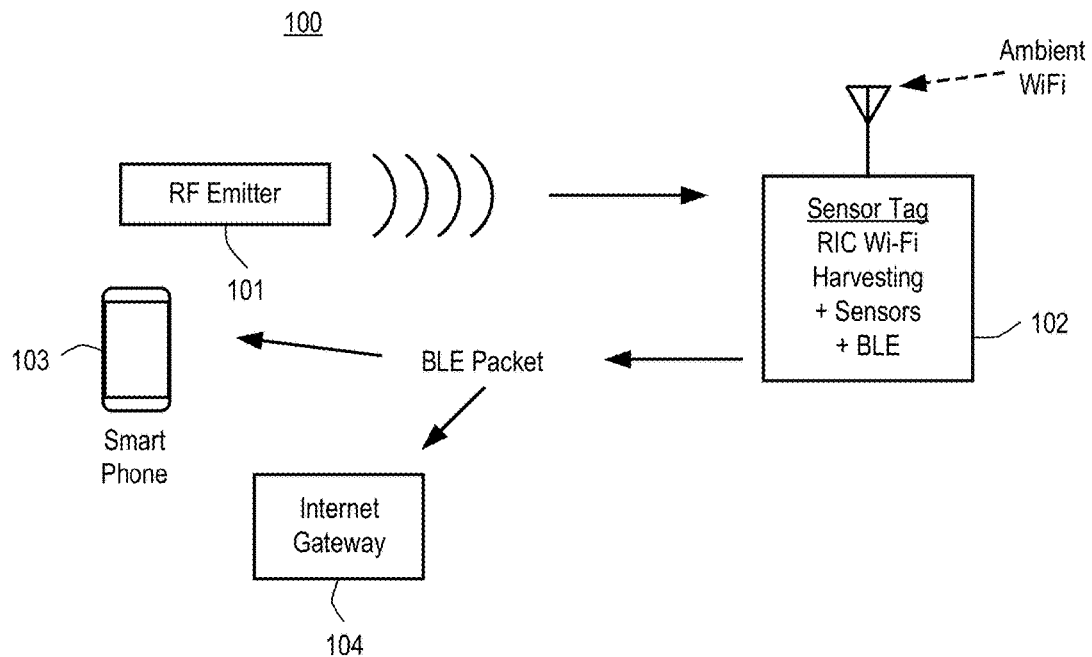
FIG. 1 is a block diagram of one embodiment of a network system configuration.

A network sensor system and method for using the same are described. In one embodiment, the network sensor system includes one or more sensor tags. These sensor tags harvest radio frequency (RF) energy and use the harvested energy to transmit data stored and/or generated as a result of sensing by the tag. The RF energy is either available from ambient sources or it is provided by an emitter (e.g., a special purpose emitter). Using the harvested energy, the sensor tags generate and transmit Bluetooth Low Energy (BLE) advertising packets. These may contain the sensor data (e.g., dynamic sensor reading results) or data that is stored in the sensor tag (e.g., predetermined identifier (ID) information). The BLE advertising packets are received by a device. In one embodiment, the device is an off-the-shelf smart phone. In another embodiment, the device is a BLE gateway device.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A non-transitory machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Sensor System Embodiments

A network sensor system having a radio-frequency (RF) emitter, one or more sensor tags, and at least one other device is described. In one embodiment, the sensor tags include at least one sensor tag having a wireless transmitter, a wireless receiver (optional), an energy harvesting unit operable to convert incident RF energy to direct current (DC) including RF energy from the RF emitter and RF energy from one or more ambient sources, a storage unit operable to store recovered DC power, one or more sensors for sensing and logging data, a controller coupled to the energy harvesting and storage units, the one or more sensors, the memory and the transmitter, to communicate data in the form of a Bluetooth Low Energy (BLE) advertising packet using energy previously harvested and stored by the energy harvesting and storage unit.

The other device receives the BLE advertising packet. In one embodiment, the device receives the BLE packet without having to perform Bluetooth pairing. In one embodiment, the device is a cell phone (e.g., smart phone). In another embodiment, the device is a BLE gateway device.

FIG. 1 is a block diagram of one embodiment of a network system configuration. Referring to FIG. 1, system 100 includes a radio-frequency emitter 101, one or more sensor tags, such as sensor tag 102, and at least one device, such as smart phone 103 and internet gateway 104. RF energy emitter 101 provides continuous wave (CW) power on a number of known frequencies. In one embodiment, the RF emitter is a low cost emitter or a Wi-Fi access point.

Sensor tag 102 harvests that energy and converts the incident RF into DC that is stored in an energy storage device (e.g., a battery, a capacitor, etc.). When sufficient energy is available, sensor tag 102 generates a packet containing data indicative of one or more sensor readings and broadcasts that packet. In one embodiment, sensor tag 102 broadcasts a BLE packet. In one embodiment, one or more sensors of sensor tag 102 supply sensor readings to a BLE transmitter of sensor tag 102, which generates the BLE packet and, using an antenna of sensor tag 102, transmits the BLE packet.

The BLE packet that can be received by any Bluetooth enabled device and does not require Bluetooth pairing to be received. This could be any type of device, and preferably mobile devices, such as tablets, mobile phones, personal digital assistants, portable computers, etc. In one embodiment, the BLE packet is received by an off-the-shelf smart phone, such as smart phone 103, or a BLE gateway device, such as internet gateway 104. In one embodiment, the BLE packet is then converted into a conventional internet message (e.g., UDP packet) and sent on to a TCP/IP address on the internet.

Sensor tags of system 100, such as sensor tag 102, are readable by a device, such as, for example, a phone or a gateway device, provided that sufficient energy is available to charge them from ambient sources and/or from an emitter, such as emitter 101. In one embodiment, they are charged from ambient sources with as low as −25 dBm incident RF energy. In one embodiment, the sensor tags (e.g., sensor tag 102) of system 100 include environmental sensors and run forever, or at least as long as RF energy is available.

In one embodiment, system 100 includes a standalone reader constructed from the combination of an emitter plus a BLE chip. In one embodiment, smart phone 102 and/or gateway device 104 may include functionality to operate as such a reader.

In various embodiments, different sensor tags are used. For example, the tags may have different energy storage arrangements and/or capabilities. In one embodiment, the tags use capacitor-only energy storage. In another embodiment, the tags use only a rechargeable battery for energy storage. In yet another embodiment, the tags use a capacitor plus a level detector that controls the gating of charge into the remaining circuitry on the tag. In still yet another embodiment, the tags use multiple capacitors in parallel for energy storage: one for high power charging and one for trickle charging. In one embodiment, a tag that only uses a capacitor for energy storage is the size of a grain of rice (and with the antenna, capacitor, integrated circuit, this might instead be the size of a quarter) but would be readable by a simple smart phone or other similar device rather than something more complex like a RFID reader.

Figure 2:
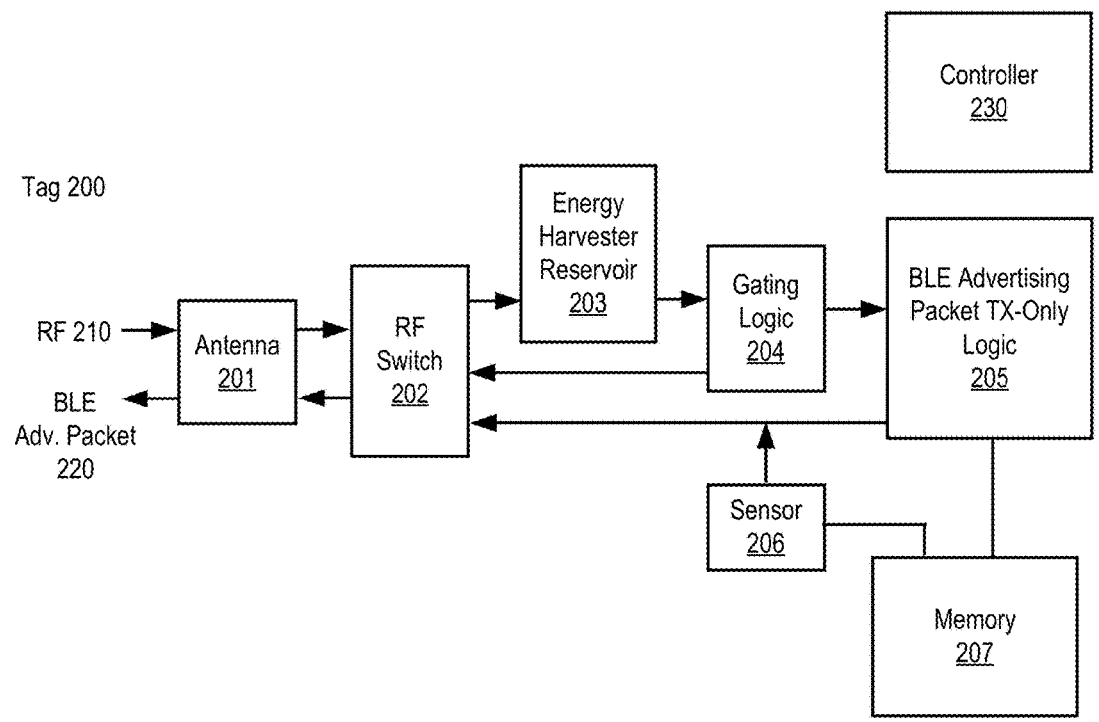
FIG. 2 illustrates one embodiment of an integrated circuit implementation of a tag.

FIG. 2 illustrates one embodiment of an integrated circuit implementation of a tag. Such a tag may be used in the system of FIG. 1. The tag includes an energy harvester reservoir 203. In one embodiment, the tag of FIG. 2 has capacitor-only energy storage and is a transmit-only tag. In one embodiment, the capacitor is replaced with a rechargeable battery. Energy harvester reservoir 203 contains the required circuit for harvesting RF into either a capacitor or battery.

Referring to FIG. 2, tag 200 includes an antenna 201, RF switch 202, energy harvester reservoir 203 (e.g., a capacitor, rechargeable battery, etc.), gating logic 204, BLE advertising packet transmitter (Tx)-only logic 205, sensor 206, and memory 207. Tag 200 also includes a controller 240 to control operations of components of tag 200. In one embodiment, controller 240 is part of Tx-only logic 205. Note also that although only one sensor is shown, in one embodiment, tag 200 includes multiple sensors. These sensors may include temperature, light level, humidity, accelerometer, gyroscope, gas detector, smoke detector, radiation detector, smell detector, etc. In one embodiment, the data from sensor 206 is stored in memory 207.

Antenna 201 is used to receive continuous wave energy 210 from an RF emitter, such as RF emitter 101 of FIG. 1, or other ambient sources or to transmit BLE advertising packet 220. Antenna 201 is coupled to other tag components through RF switch 202.

Harvester reservoir 203 stores direct current (DC) that has been converted from incident RF energy. The RF energy may be from the RF emitter (e.g., RF emitter 101 of FIG. 1) and RF energy from one or more ambient sources. Harvester reservoir 203 is part of an energy harvesting unit (the rest of which is not shown in FIG. 2 to avoid obscuring the invention) that converts the RF energy that is sent to harvester reservoir 203 for storage.

BLE advertising packet Tx-only logic 205 generates and transmits BLE advertising packets. In one embodiment, the BLE advertising packets include sensor readings from sensors, such as sensor 206. In another embodiment, the BLE packets include other information, such as, for example, but not limited to, tag identifier (ID) information, location of the tag, identifier for the rack in a data center in which it is installed, identifier for a person who or last serviced or installed the tag, battery status, a log of past sensor values, etc. In one embodiment, BLE advertising packet Tx-only logic 205 comprises a typical BLE chip whose receiver has been eliminated or removed. Such an implementation would save power.

Harvester reservoir 203 is combined with gating logic 204 to trigger the transmission of a BLE advertising packet from Tx-only logic 205. In one embodiment, gating logic 204 uses a voltage detector to detect the voltage across the capacitor. Based on the voltage level reaching a level that allows tag 200 to perform functions, gating logic 204 turns on Tx-only logic 205 or causes Tx-only logic 205 to turn on. In one embodiment, gating logic 204 turns on Tx-only logic 205 by sending it or controller 230 an interrupt to indicate that it is to wake up. In the case of sending controller 240 an interrupt, controller 230, in response thereto, would signal Tx-only logic 205 to turn on and perform a BLE advertising packet transmission.

In one embodiment, tag 200 acts as a logger in which the sensor readings from a sensor, such as sensor 206, occur when energy harvester reservoir 203 of tag 200 has accumulated enough ambient energy to turn sensor 206 on to take a sensor reading and then store that data a memory 207 on tag 206. In one embodiment, memory 207 is part of Tx-only logic 205. Later, tag 200 may provide the sensor data as part of a BLE packet when it has stored enough energy from ambient sources and/or the emitter to transmit such a packet. In another embodiment, tag 200 acts as an instant recorder in that sensor 206 is not turned on to take a reading until tag 200 is to provide the data in a BLE packet. In such a case, when an emitter (e.g., emitter 101 of FIG. 1) is present, tag 200, including energy harvester reservoir 203, harvests enough power to turn on sensor 206 to take a sensor reading, store the data in a tag memory (e.g., memory 207), create the BLE packet and transmit the BLE packet using Tx-only logic 205.

Gating logic 204 also changes "the direction" of RF switch 202. When energy harvester reservoir 203 is charging, RF is passed from antenna 201 into energy harvester reservoir 203 and when enough charge has been accumulated in energy harvester reservoir 203 to power Tx-only logic 205 to transmit a BLE advertising packet, gating logic 204 signals RF switch 202 to change the direction of RF switch 202 and BLE TX-only logic 205 is "turned on."

In one embodiment, a sensor reading from sensor 206 is inserted in the BLE advertising packet and it is transmitted out of antenna 201 of tag 200.

Note that energy harvester reservoir 203, or other rechargeable battery or energy storage, in FIG. 2 provides power to components of tag 200, including BLE advertising packet Tx-only logic 205, gating logic 204, sensor 206 and RF switch 202.

An Example Emitter Embodiment

Figures 4, 5:
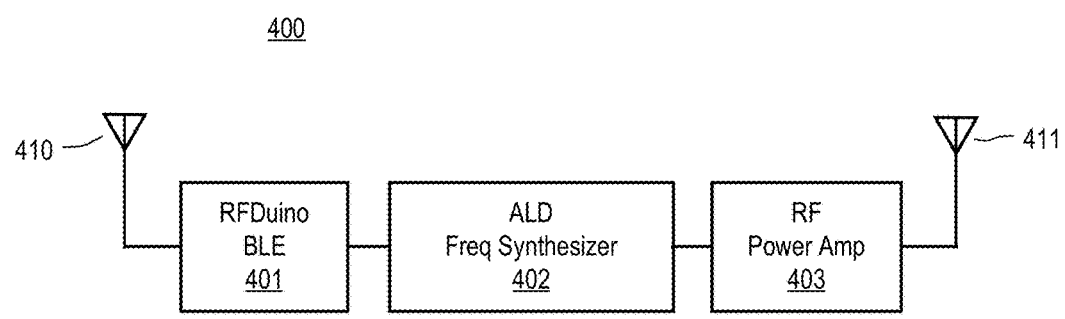
FIG. 4 is a block diagram of one embodiment of an emitter.
FIG. 5 illustrates one embodiment of a control algorithm for choosing the frequencies and dwell times for the emitter.

FIG. 4 is a block diagram of one embodiment of an emitter. In one embodiment, the emitter transmits a continuous wave (CW) of RF energy on a number (N) of known frequencies. In one embodiment, these frequencies do not overlap with the three frequencies (2.402, 2.426, 2.480 GHz) in the 2.4 GHz band that are used for BLE advertising packets.

Referring to FIG. 4, emitter 400 comprises a microcontroller and a BLE transceiver is used as the controller and transmitter 401, a frequency synthesizer 402, an RF power amplifier 403, and a pair of antennas 410 and 411. In another embodiment, only one antenna is used and a switch is used to determine which is active. In one embodiment, frequency synthesizer 402 comprises an Analog Devices ADF4360 frequency synthesizer, RF power amplifier 403 comprises a Skyworks SE2623L power amplifier, controller and transmitter 401 comprises a RFduino that contains a microcontroller and a BLE transceiver is used as the controller and transmitter, and antennas 410 and 411 comprise a conventional commercially available 8 dBi patch.

In one embodiment, emitter 400 executes a sweep algorithm to determine which frequency provides the best power transfer efficiency for the sensor tag. In other words, the sweep algorithm is performed to find the frequency that provides the best harvesting efficiency. FIG. 5 illustrates one embodiment of a control algorithm for choosing the frequencies and dwell times for the emitter (e.g., emitter 400 of FIG. 4). The dwell time refers to the amount of time that the sensor tag spends receiving RF energy at a specific frequency to enable the tag to charge to a level that enables the tag to perform certain functions such as, for example, transmitting the BLE advertising packet.

In one embodiment, the sweep algorithm is performed repeatedly at various small time intervals (e.g., every ten seconds, every minute, once per day, or also on known physical system changes such as moving items in the room or adding new tags, etc. In alternative embodiments, particularly where the environment is not changing, the sweep algorithm is performed only after large intervals of time (e.g., a week, etc.).

In one embodiment, the frequencies used in the sweep algorithm are chosen based the characteristics of the harvester. In one embodiment, the sweep algorithm is sweep through 10-20 different frequencies. In one embodiment, these frequencies are chosen in the 2.4 GHz ISM band and the sweep algorithm sweeps across the 2.4 GHz ISM band, exclusive of the frequencies used for return communication (which include three BLE advertising channels in one embodiment).

In one embodiment, the dwell time is set to provide enough energy to charge the rechargeable energy storage device or element (e.g., a capacitor) in the tag and provide enough energy to send a BLE advertising packet. If enough energy can be accumulated, the combination of the voltage across the capacitor and the received signal strength ($RSS_i$) of the packet when it's received at the emitter at the smart phone, provides a measurement of the power transfer efficiency of the selected frequency. A higher value of power transfer efficiency indicates that the continuous wave at the corresponding frequency will charge the capacitor faster than a continuous wave at a frequency with a lower PTE.

When performing the sweep algorithm, in one embodiment, the operations both emitter and tag are synchronized so that the tag is able to properly record an indication of the frequency RF energy that is being harvested (i.e., used to charge a rechargeable element such as, for example, a capacitor, rechargeable battery, etc.). In one embodiment, the tag includes a wake up radio (as opposed to a radio that decodes data) that monitors transmitted data (e.g., bit patterns) and turns on the tag in response to identifying transmitted data that indicates the sweeping algorithm is starting.

In an alternative embodiment, a wake up radio is not necessary and the synchronization occurs in response to the tag transmitting a packet indicating that it wants to be charged and then waiting a certain pre-determined period of time to start recording frequencies. In response to the packet, the emitter using the same period of time is able to then start transmitting those frequencies at the proper delay time so that the recording of the charging frequencies is coordinated between the emitter and the tag.

Referring to FIG. 5, the search( ) function returns a list of frequencies $F=(f_i,PTE_i)$ where $PTE_i$ is the power transfer efficiency for $f_i$. F is sorted in decreasing order of $PTE_i$. The select( ) function returns a list of frequencies S to sweep across and the order in which the sweep is performed. The operation sweep(S) performs the sweep. In one embodiment, the sweep algorithm continues without exiting. In another embodiment, the sweep algorithm is performed again if recalibration is in order. This might be necessary because, for example, the emitter was moved. In one embodiment, such a move is detected with a sensor such an accelerometer. In that case, the loop is executed again. This can continue until it's no longer useful to emit power for the sensor tag. This could be detected by the inability of the search( ) function to find a set of frequencies that have power transfer efficiency values above threshold. In that case, the search( ) function would set F to empty, the select( ) function would set S to empty, the sweep( ) function would exit without doing anything, and the repeat loop would pass control to the parent function.

As the emitter emits waves at each of the different frequencies when performing the sweep algorithm, the tag records information identifying the frequency that produced the most charge energy, along with the charge energy for that frequency. In one embodiment, the tag determines the charge energy for each frequency as the voltage across the capacitor. In one embodiment, the information identifying the frequency is an index of the frequency as the emitter sweeps through the frequencies. As the waves of different frequency are received, the tag determines the charge energy that was harvested and if it was greater than the charge energy for the previous frequency, then the tag stores the amount of energy and information (e.g., an index) of which frequency it was. By using this process, at the end of the sweep, the tag has recorded the information indicative of the frequency that produced the most charge energy for the tag over the dwell time and the amount of that charge energy. The tag sends this information to a device (e.g., smart phone 103 in FIG. 1) in the network. In one embodiment, the information is sent in a BLE packet. In one embodiment, the combination of received signal strength ($RSS_i$) of the packet and the information contained therein (e.g., the voltage across the capacitor to indicate the amount of charge stored in one embodiment) is used by determine the PTE.

Note that the power transfer efficiency includes the RSSi of the BLE packet, and a low RSSi indicates that the RF environment has changed in between the time of the sweep and reception of the BLE packet, thus indicating that the sweep should be performed again. Thus, even though the tag may only transmit an index or other information indicative of the one frequency back to the device that produced the highest charge, in one embodiment, the power transfer efficiency is still calculated.

One embodiment of a process that increases the performance of simultaneous efficiency of harvesting and communication with computation is as follows. In one embodiment, the process is performed by emitter 101, tag 102 and smart phone 103.

First, the emitter executes the sweep algorithm discussed above and determines the frequency F that provides the best power transfer efficiency. From the best power transfer efficiency, the charging rate at the tag is estimated. In one embodiment, the charging rate is the amount of energy that can be accumulated to do useful work in a given period of time. The emitter knows the charging rate because it controls the sweep frequencies.

Second, and simultaneously with the start of the emitter's sweep, a device in the system (e.g., smart phone 103 of FIG. 1) transmits a wakeup packet that identifies a specific tag identifier (id) TAG_ID. This is optional. The wakeup packet notifies the tag that has the TAG_ID that the emitter is starting the sweep algorithm. In essence, the wakeup packet tells the tag to turn on its receiver so that it is able to receive the continuous wave energy being transmitted by the emitter as part of the sweep algorithm.

Third, the emitter notifies the device (e.g., smart phone) that it's locked on frequency F at a charging rate. Next, a software application on the device (e.g., smart phone 103) is given information (e.g., task id for TAG_ID, energy cost, acceptable wait time, charging rate) and determines whether the tag is to execute that task. For example, if a task is "transmit sensor log", the expected cost for that is 10 mJ, the acceptable wait time is 2 minutes, and charging rate is 100 mJ per minute. In that case, the application may choose to have the tag execute that task because the task can be completed in an acceptable time. On the other hand, if the charging rate is 1 mJ per minute, the application might not want the tag to execute the task because the task can't be completed within an acceptable amount of time. In one embodiment, in such a case, the application causes the emitter to transmit a message instructing the tag not to transmit. In another embodiment, the application causes the device (e.g., smart phone 103) to transmit a message instructing the tag not to transmit. Thus, based on the charging rate for the tag, and given the frequency that the emitter is using to charge the tag, the device determines what it wants the tag to do.

Figure 6:
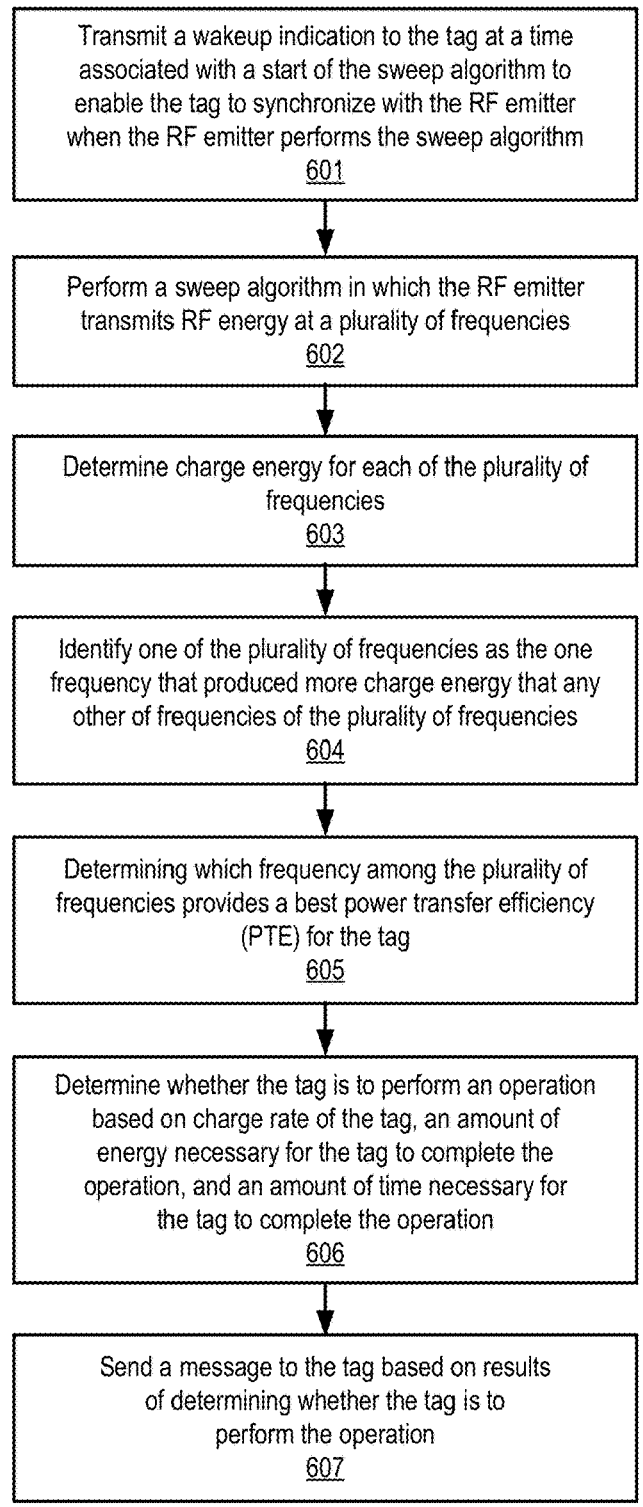
FIG. 6 is a flow diagram of one embodiment of a process for performing a sweep algorithm.

FIG. 6 is a flow diagram of one embodiment of a process for performing a sweep algorithm. The process is performed by processing logic that may comprise hardware (circuitry, dedicated logic, etc.), software (such as is run on a general purpose computer system or a dedicated machine), or a combination of both.

Referring to FIG. 6, the process begins with processing logic transmitting a wakeup indication or notification (e.g., pulse, packet, etc.) to the tag at a time associated with a start of the sweep algorithm to enable the tag to synchronize with an RF emitter when the RF emitter performs the sweep algorithm (processing block 601). In one embodiment, this is performed by a device, such as a smart phone, in the network.

Next, and potentially simultaneously with the tag receiving a notification, processing logic performs a sweep algorithm in which the RF emitter transmits RF energy at a plurality of frequencies (processing block 602).

In response thereto, processing logic determines the charge energy for each of the plurality of frequencies used in the sweep (processing block 603) and identifies one of the plurality of frequencies as the one frequency that produced more charge energy that any other of frequencies of the plurality of frequencies (processing block 604). In one embodiment, the processing logic that performs these operations is part of the tag.

Based on the identified frequency, processing logic determines which frequency among the plurality of frequencies provides a best power transfer efficiency for the tag (processing block 605). Such an operation may be performed by a device, such as a smart phone, in the system. In one embodiment, the power transfer efficiency for the tag is based on the charge energy at the one frequency and the received signal strength of a BLE packet from the tag.

Processing logic determines whether the tag is to perform an operation based on charge rate of the tag, an amount of energy necessary for the tag to complete the operation, and an amount of time necessary for the tag to complete the operation (processing block 606) and sends an indication (e.g., message, predetermined pulse or packet to the tag based on results of determining whether the tag is to perform the operation (processing block 607). In one embodiment, the indication indicates to the tag that the tag is not to perform a transmit operation or indicates to the tag that the tag is to perform a transmit operation.

Figure 8:
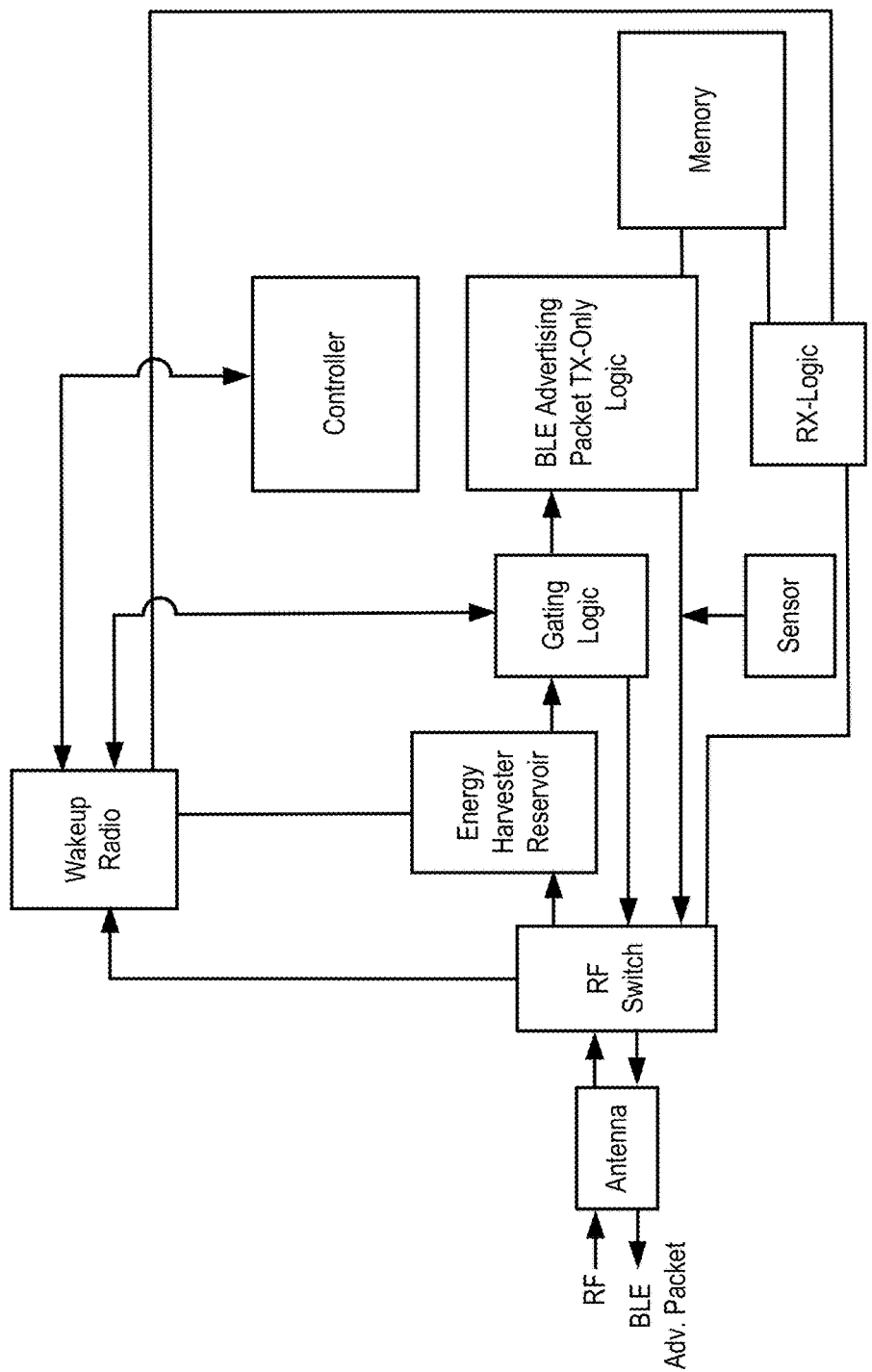
FIG. 8 illustrates one embodiment of a tag that includes both a transmitter and a receiver.

In one embodiment, the system is able to write data into the tag. Subsequently, the tag is able to provide such data to devices in the system. In such a case, the tag includes a receiver. FIG. 8 illustrates one embodiment of a tag that includes both a transmitter coupled as in FIG. 2 and a receiver logic (Rx-logic) coupled to RF switch, a memory, and the energy harvester reservoir. The transmit logic is also coupled to the memory. The tag also includes a wakeup radio that is coupled to the antenna, the gating logic, and the controller.

In one embodiment, when we are writing data into the tag, information (e.g., an instruction) is sent to the tag about which frequencies to listen on so that energy and data are transmitted on frequencies with high power transfer efficiency, but that are spaced as far apart as possible. This is to minimize the interference between the continuous wave energy and the data channel.

In one embodiment, in contrast to standalone RFID readers, a smart phone or similar mobile device could write data into the tags. This greatly simplifies the process of writing data into RFID tags, which requires a special purpose reader. With the techniques described herein, with a full BLE transceiver, any user with a smart phone, which is lower cost than a current RF reader, could write data into the tags, thus obviating the need to have a separate reader for this purpose.

In one embodiment, the process for receiving the information and writing the information into the tag includes a tag sending, and a device, such as a smart phone (e.g., smart phone 103) receiving, a BLE advertising packet that indicates the tag's presence to the device. The device locates the tag to which it is to provide the information and signals the tag to turn on its receiver. This can be done by sending a wakeup pulse with the tag's address to the tag.

When communicating with an object having a tag attached thereto, the device may not know which object with which it is communicating. To identify which object it is, the device points at different objects and uses a recognition system to recognize the object. In one embodiment, the device is pointed at an object and the object is visually recognized and matched to information stored in a database (e.g., a purchasing database. In alternative embodiments, the recognition is done by recognizing a bar code or serial number (using OCR) attached to the object.

Figure 3:
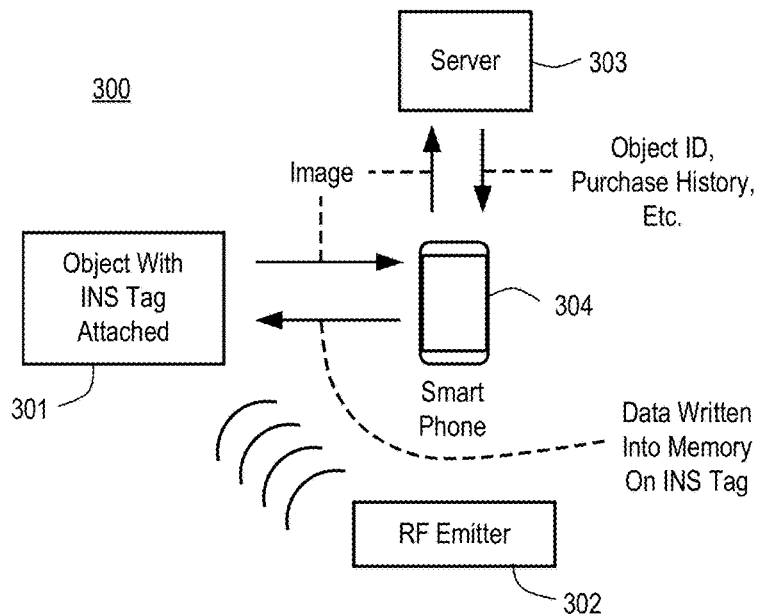
FIG. 3 is a block diagram of one embodiment of a network system employing Ricoh Visual Search (RVS) to write data into tags.

FIG. 3 is a block diagram of one embodiment of a network system employing visual object recognition to write data into tags. Referring to FIG. 3, network system 300 includes one or more objects with an attached tag, such as for example tag 301, at least one RF emitter, such as RF emitter 302, a visual search server 303, and a device 304 (e.g., smart phone, mobile device, tablet, PDA, portable computer, etc.).

In operation, to identify which object it is, device 304 is pointed at different objects and visual object recognition server 303 is used recognize the object. Device 304 takes a picture of the object, such as object 301. Device 304 sends the picture or some data obtained from the picture to visual recognition server 303 such as, the results of recognizing QR codes or OCR of text in the image. Visual recognition server 303 performs object recognition using the picture, or data from the picture, to identify object 301. In one embodiment, the recognition procedure for identifying one or more items in an image is performed as described in U.S. Publication No. 2015/0049902, entitled "Recognition Procedure for Identifying Multiple Items in Images," filed Aug. 14, 2013. In one embodiment, visual recognition server 303 is in the cloud or another remote location and performs recognition remotely. In another embodiment, visual recognition server 303 is on device 304 itself. Visual recognition server 303 returns the results of the recognition which device 304 compares to the information it has. Using the results of the comparison, device 304 is able to determine the object to which it is communicating.

In one embodiment, the data that is written into the tag is retrieved from a purchasing database or the World Wide Web. In one embodiment, a company, such as Ricoh, as part of an asset tracking service offering, provides a file on the web that could be searched on-line with a command such as "site:ric.ricoh.com/ins_RVS_db serial_number" and the data associated with the serial number would be retrieved and written into the tag.

In one embodiment, in order to be able to respond to the sweep algorithm, broadcast data and receive data, the tag has three modes of operation, namely the first, second and third modes, each of which is triggered by a different wakeup packet, or pulse (e.g., a high energy pulse detected with a peak detector or window comparator. In the first mode, a device in the system, such as smart phone 103, is only trying to determine what tags are present and sends a pulse to cause each tag to transmit identification information. In the second mode, the tag is notified that the device (e.g., smart phone 103) wants to receive information from the tag but the tag need not turn on its receiver. In the third mode, the wake up pulse indicates to the tag that a device (e.g., smart phone 103) wants to receive the tag's information and that the tag should turn on its receiver. In one embodiment, the wakeup pulse identifies the tag and may be used to identify the receiver from which the message is coming back from the tag.

Example Applications

There are many applications for a network system. In one embodiment, data centers perform environmental monitoring and/or asset monitoring (tracking) using the tags described herein. In environmental monitoring, the tags, which include sensors (e.g., sensors for temperature, humidity, air flow, and/or air pressure), are distributed in three dimensions throughout a data center and used to provide a visualization of environmental characteristics. For example, the information from the tags can indicate how an environment is impacted when the HVAC system is adjusted.

In another embodiment, the network sensor system is used for asset tracking. For almost no additional cost, in one embodiment, electronically readable tags are added to objects and information is written into those tags that identify an item. For example, in a data center embodiment, in asset tracking, the tags are attached to assets (e.g., disk drives, servers, etc.) and used to track the locations of those assets as they are moved within the data center. Importantly, in one embodiment, those tags are guaranteed to be readable virtually forever. This system allows a business owner to tag any object in their inventory with information that identifies the purchase history of the object (e.g., who ordered, when, cost, delivery date, etc.). That information would be resident on the tag rather than an external database, which is the conventional system solution for RFID.

In one embodiment, the tags disclosed herein are used to create a self-documenting inventory system. Users can walk around a facility and scan the tags on the objects they encounter. Information, such as, but not limited to, date, time, and location of that scan is stored with the rest of the data in the tag. In one embodiment, an indoor location system is utilized in conjunction with the device (e.g., a mobile device, such as smart phone 103 of FIG. 1) to identify where the device is. This indoor location system provides location information correlated with the time and date that may be used and stored on the tag as its location with the rest of the tag data. In one embodiment, the tag receives this information using a receiver that is woken up with the use of a wake up pulse. In an alternative embodiment, the tag may be woken up through a bumped detection mechanism that allows the tap to be made to the tag to wake it up. In yet another alternative embodiment, the tag may be woken up through the use of an audio detection system that turns on the tag in response to the receipt by the tag of a predetermined sound. Other detection mechanisms may be utilized (e.g., light detectors, temperature detectors, smoke detectors, smell detectors, gas detectors, radiation detectors, etc.

In one embodiment, the tag always transfers the scan history when it powers up. In another embodiment, the tag only transfers a portion of the scan history data. This may be based on the amount of charge that is available for it to transfer such data. This may also be in response to a particular wake up pulse that is received that indicates that only a certain portion or all of the scan history is desired. In one embodiment, only a portion (i.e., less than all) of the scan history is transferred each time.

In one embodiment, the scan history (e.g., information specifying the date, time, and location of a scan) is automatically uploaded to a remote location (e.g., a cloud service) and enables the creation of a map of assets. In one embodiment, this cloud-based asset tracking service stores the location of assets over time. In one embodiment of such a service, every time an asset is scanned, a software application on the phone (e.g., smart phone 103) writes data about the transaction (date, time, location, sensor reading history) to the cloud-based asset tracking service.

Because the scan history is stored on the tag, the location history of the object would be self-contained on the tag. At any time in the future, e.g., when a company's assets are audited, any person could do a complete inventory of the assets by walking around a facility and pointing an emitter at the objects they want to scan. This self-documenting inventory system provides a method of verifying data in the company's purchasing database. Using the system, one can show assets that are on a company's premises but that are not in the purchasing database. The last known location of assets that are in the PD but that were not found during the inventory scan can be flagged and someone can be sent out to look for them.

Figure 7:
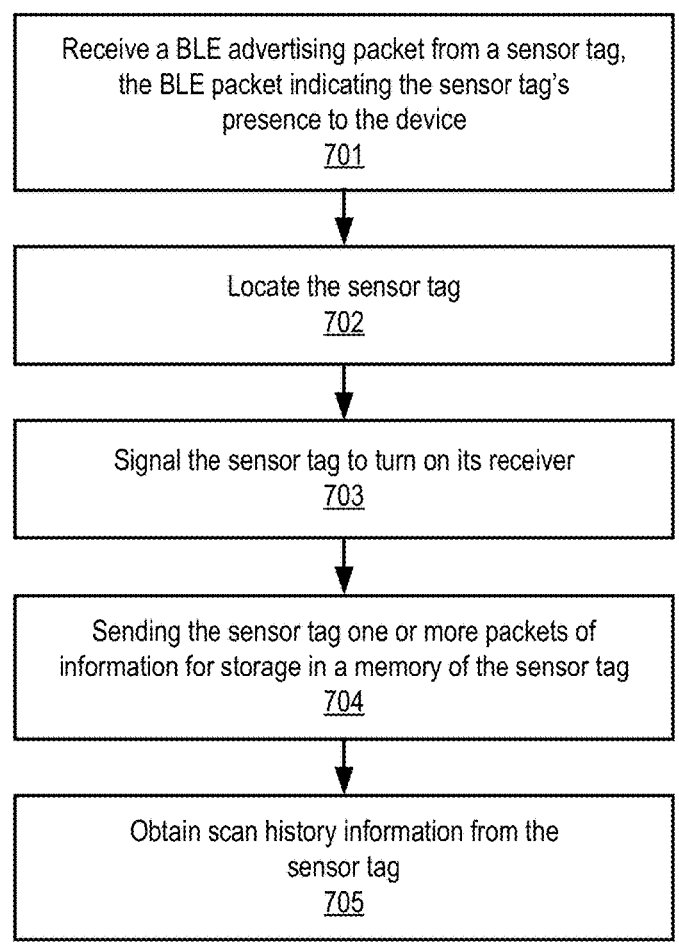
FIG. 7 illustrates is a flow diagram of one embodiment of an asset tracking process using the network system tags.

FIG. 7 is a flow diagram of one embodiment of an asset tracking process using the network system tags described herein. The process is performed by processing logic that may comprise hardware (circuitry, dedicated logic, etc.), software (such as is run on a general purpose computer system or a dedicated machine), or a combination of both.

Referring to FIG. 7, the process begins by processing logic receiving a BLE advertising packet from a sensor tag, where the BLE packet indicates the sensor tag's presence to the device (e.g., smart phone 103) (processing block 701). Next processing logic locates the sensor tag (processing block 702) and signals the sensor tag to turn on its receiver (processing block 703). Then processing logic sends the sensor tag one or more packets of information (e.g., asset tracking/identification information) for storage in a memory of the sensor tag (processing block 704). Subsequently, processing logic, which may be part of device different from the device that sent the tag other information previously, obtains scan history information from the sensor tag (processing block 705).

In one embodiment, the inventory is accomplished remotely via the web, provided there are enough fixed-location scanners to cover the area of interest.

Note that scan history or asset tracking data could be combined with data from other nearby sensors (e.g., a temperature sensor on the wall that reports data over a 3G connection) to provide an auditable chain of sensor evidence. For example, the temperature read from the tag should match the independently reported reading from the wall-mounted sensor. Once a determination is made that the temperature read for the tag independently matches that reported from a wall mounted sensor, the auditable chain can be used to verify that the temperature as evidenced matched an agreed upon temperature setting. This may be useful for insurance purposes. In one embodiment, the determination of whether the temperatures match is made in the cloud. In alternative embodiments, the determination is made by the mobile device (e.g., smart phone 103).

In another embodiment, the comparison of temperature readings may be used to identify whether there are any temperature sensors in a network of the temperature sensors that are providing results that do not match the rest of the sensors in the group (where matching is based on whether the compared temperatures are within a predetermined small temperature range). The results of such a comparison may be used for diagnosis purposes where diagnosis of a potential problem may be made. For example, if a large location has a number of temperature sensors and the location is designed to maintain the temperature at a certain range, an identification of one or more sensors that are providing temperatures outside a predetermined range may indicate the location of a problem in the temperature maintained location.

In another embodiment, fixed-location scanners could be developed that are always-on and accessible from the cloud. These could provide the same service as the handheld energizer/BLE transceiver device, but does not require a person to walk around the facility first.

Health care is another application for the network system described herein.

In one embodiment, special purpose tags are deployed that use the bare metal of the racks as in the data center as ground planes. This allows multiple antennas to share a ground plane and thus improves power harvesting efficiency. This is a technical competitive advantage for the tags described.

RF Energy Harvester

Figure 9:
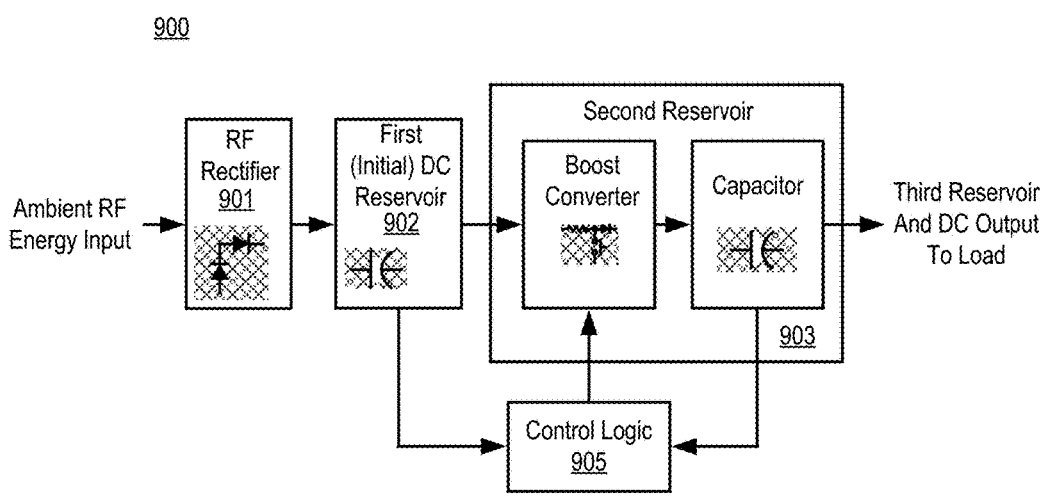
FIG. 9 is a block diagram of one embodiment of an RF energy harvester.

FIG. 9 is a block diagram of one embodiment of an RF energy harvester. Referring to FIG. 9, RF energy harvester 900 comprises RF rectifier 901, a first direct current (DC) reservoir (storage) 902, a boost converter and second reservoir 903, a third reservoir 904, and control logic 905.

RF rectifier 901 receives ambient RF energy input received from an antenna and rectifies the RF energy to produce a DC voltage.

First DC reservoir 902 stores the voltage generated from the rectified RF signals received by device 100. In one embodiment, reservoir 902 comprises a capacitor. In one embodiment, the size (value) of the capacitor that is selected for use is based on the stored energy above a voltage threshold for the ambient RF input power.

Figure 14A:
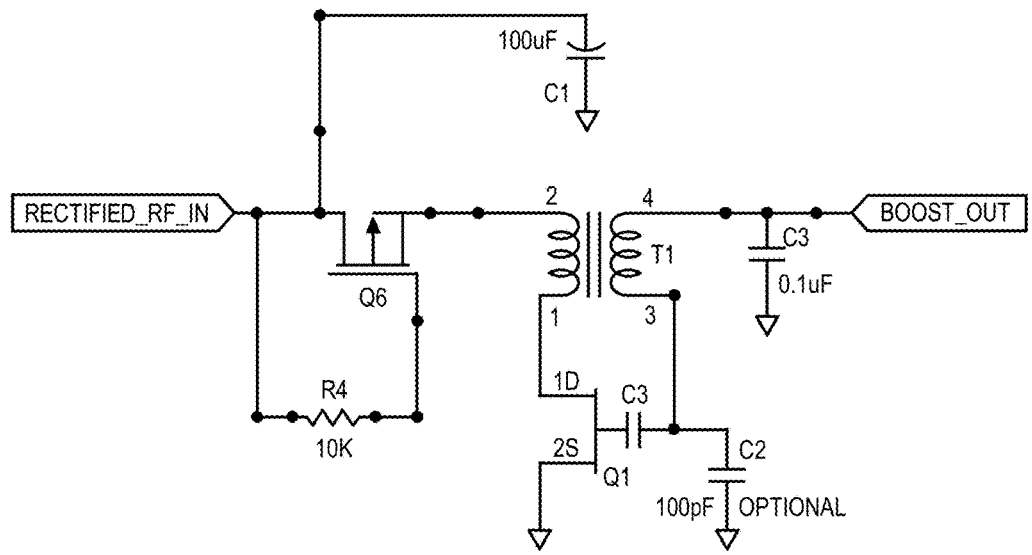
FIG. 14A is a circuit schematic of one embodiment of a DC-DC boost converter.
Figure 15A:
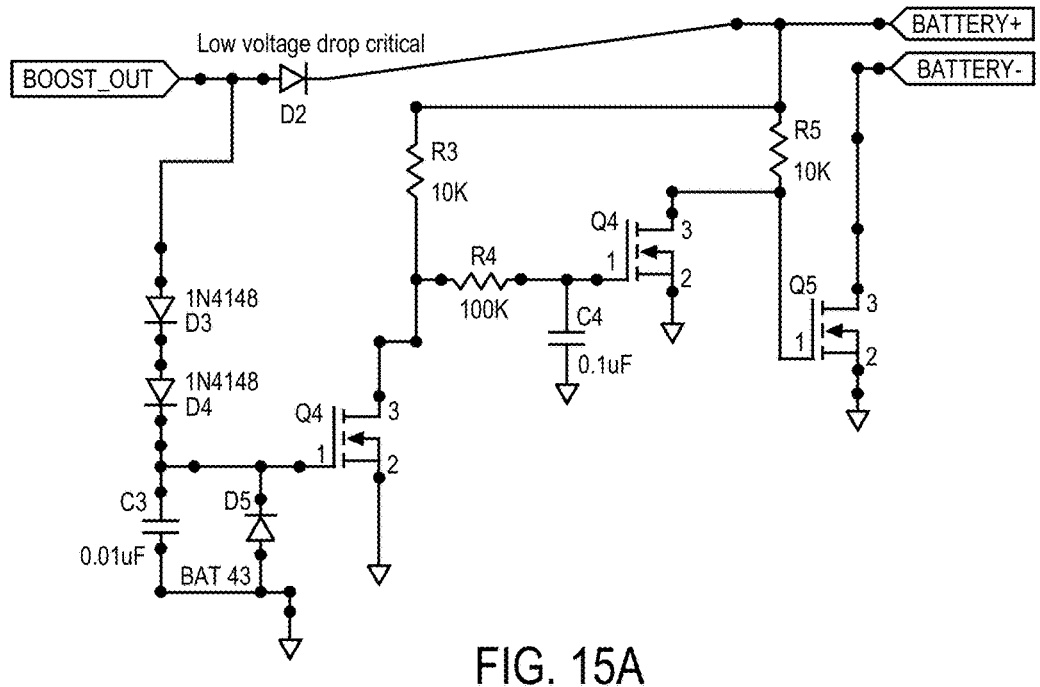
FIG. 15A is a circuit schematic of one embodiment of a battery charger.
Figure 14B:
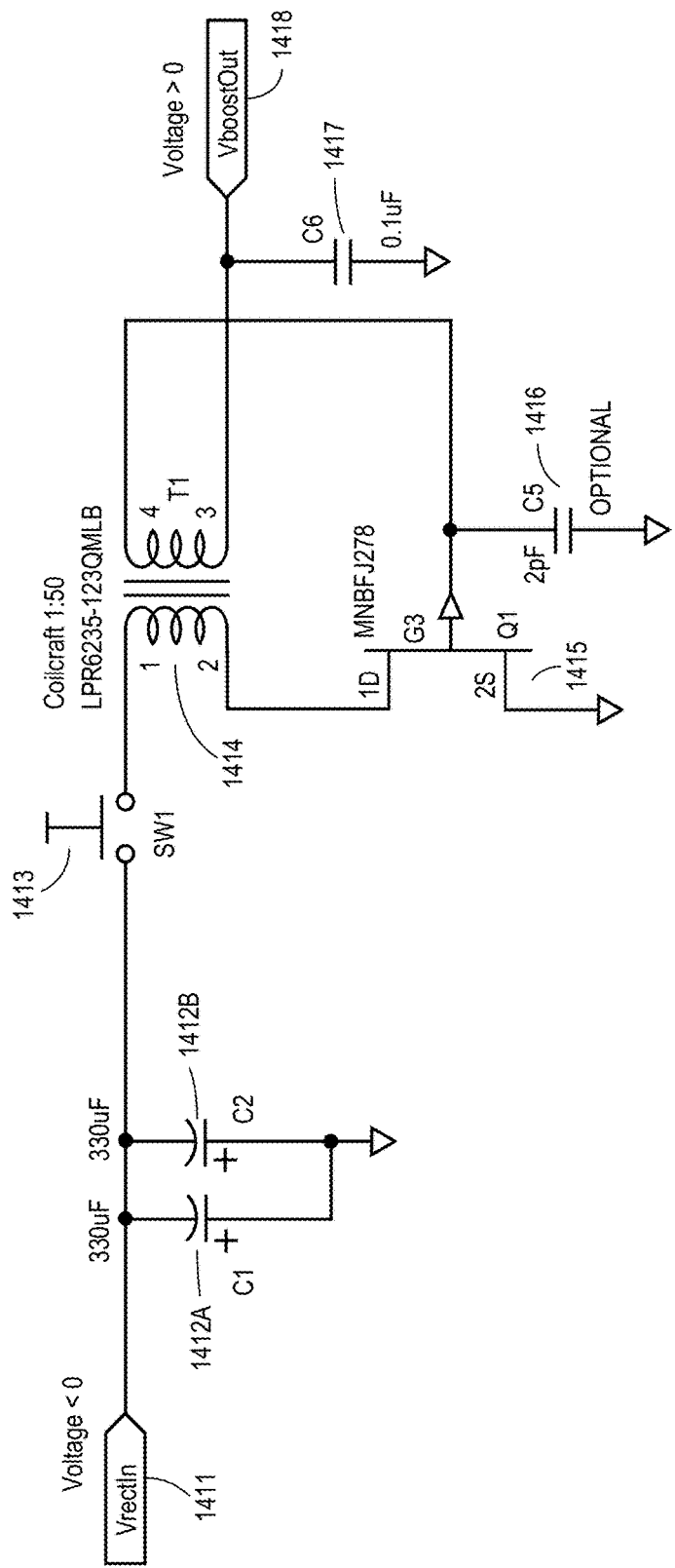
FIG. 14B is a circuit schematic of an alternative embodiment of a DC-DC boost converter.
Figure 15B:
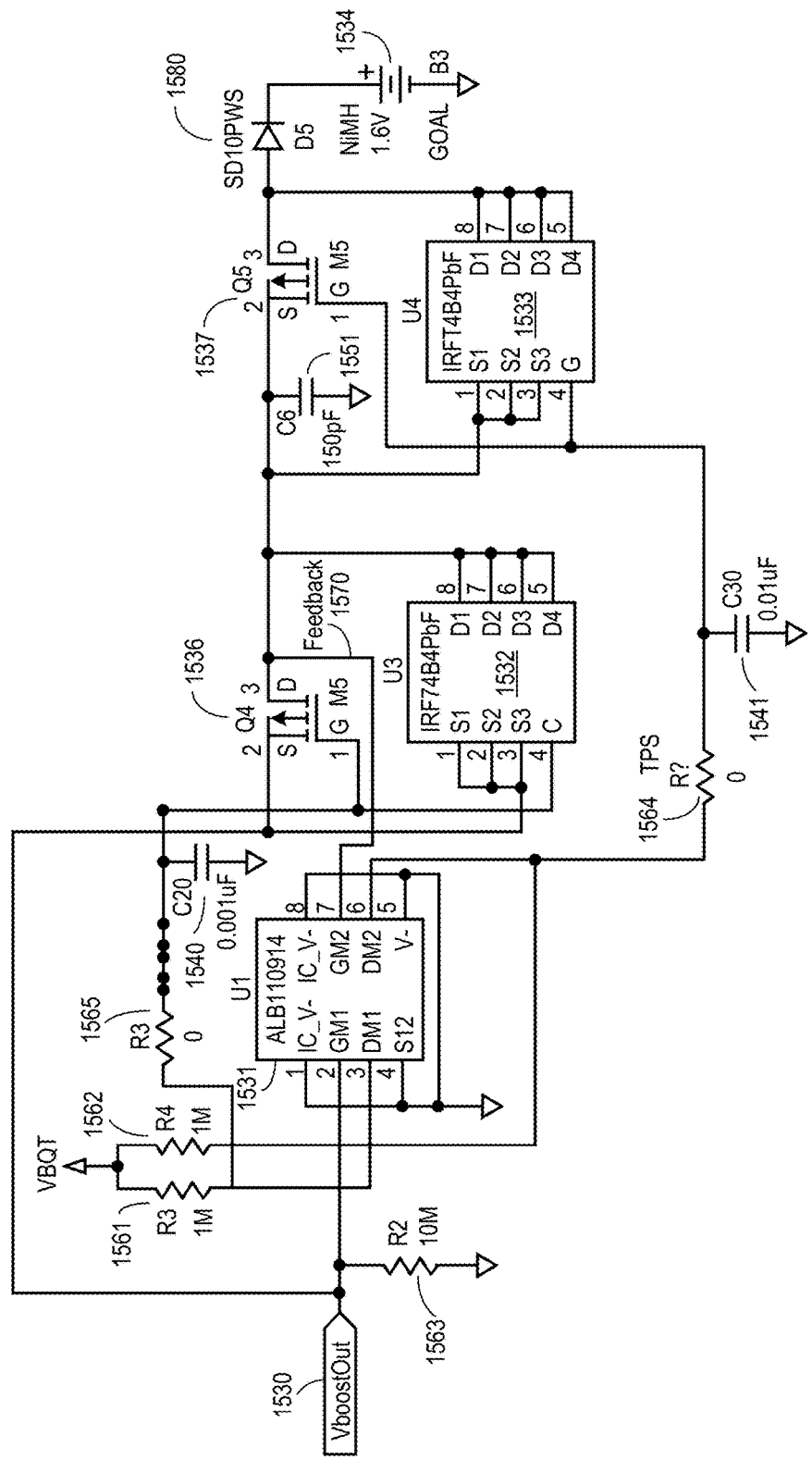
FIG. 15B is a circuit schematic of an alternative embodiment of a battery charger for a similar type of battery system as FIG. 14B.

Second DC reservoir 903 receives the voltage and increases the voltage. To increase the voltage, second DC reservoir 903 includes a DC/DC converter. In one embodiment, the DC/DC converter comprises a boost converter which includes a self-excited oscillator for operation. The self-excited oscillator includes a junction field effect transistor (JFET) coupled with a transformer. In one embodiment, the amount of the boost conversion is a function of the input energy, and the DC/DC converter is designed to maximize the output voltage as a function of input voltage in this low-energy environment. FIGS. 14A and 14B illustrate embodiments of a booster converter circuit. FIGS. 15A and 15B illustrate embodiments of a charger schematic that receives the output of the boost converter, such as, for example, the one shown in FIG. 14A or 14B.

The upconverted voltage from the DC/DC converter is stored in a storage device of second reservoir 903. In one embodiment, second reservoir 903 uses a capacitor to store the upconverted voltage. In another embodiment, second reservoir 903 uses an inductor to store the upconverted voltage, but this is a much shorter-term storage option.

When the energy stored in second reservoir 903 reaches a certain level, the energy is transferred to a third reservoir (not shown). Thus, the transfer occurs periodically at a rate determined by the amount of input energy. In one embodiment, the third reservoir comprises a battery, a capacitor, a supercap, etc. The third reservoir provides DC energy to a load.

In one embodiment, the load comprises a sensor, processor or microcontroller, and/or a communication unit. In one embodiment, the DC voltage from the third reservoir is able to run the load, while the voltage produced by rectifier 901 would not be able to do so.

Control logic 905 controls the energy harvesting process. In one embodiment, control logic 905 comprises a separate unit that generates control signals to control each of the reservoirs 902-903. In another embodiment, the control is distributed through various discrete gating components such that a separate control unit is not necessary but the function is still performed.

Figure 10:
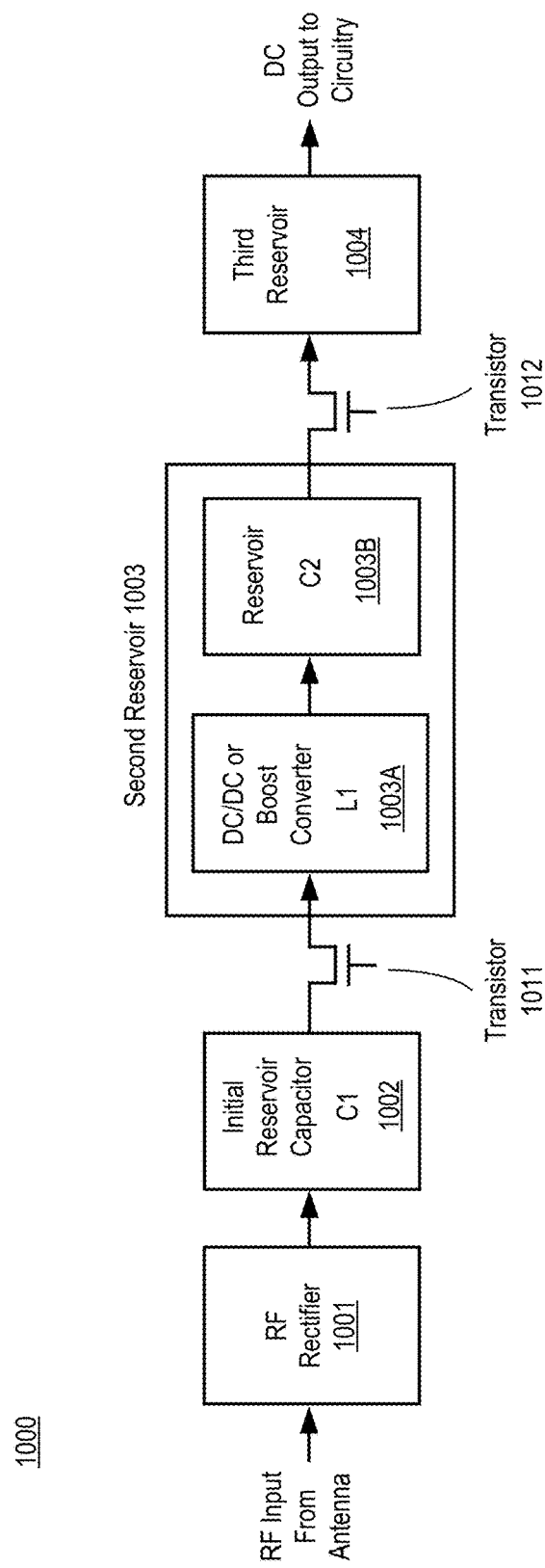
FIG. 10 is another more detailed block diagram of one embodiment of an RF energy harvester.

FIG. 10 is another more detailed block diagram of one embodiment of an RF energy harvester. Referring to FIG. 10, RF energy harvester 1000 comprises RF rectifier 1001, a first direct current (DC) reservoir (storage) 1002, second reservoir 1003, and a third reservoir 1004. In one embodiment, the input to RF rectifier 1001 is an RF input from an antenna on the sensor device. RF rectifier 1001 converts the RF input signals to a voltage. In one embodiment, the voltage may range between 10 mV and 500 mV. The voltage is stored in reservoir 1002. In one embodiment, reservoir 1002 comprises a ceramic capacitor 1 uF to 100 uF or more.

In one embodiment, the stored energy from reservoir 1002 is transferred to second reservoir 1003 via a transistor 1011, self-gated as the voltage rises in reservoir 1002. In one embodiment, second reservoir 1003 comprises a boost converter 1003A. The boost converter 1003A operates to upconvert the voltage stored in reservoir 1002 and store that upconverted voltage into reservoir 1003B.

The energy stored in second reservoir 1003 is transferred to third reservoir 1004. In one embodiment, third reservoir 1004 comprises a tantalum capacitor, supercap 100 uF to 1 F or a battery. In one embodiment, transistor 1012 (e.g., a FET) couples second reservoir 1003 to third reservoir 1004, which turns on when second reservoir 1003 reaches an optimal voltage. In one embodiment, transistor 1012 is controlled at least in part by the envelope of the received RF energy such that when the voltage stored in reservoir 1003B reaches a certain watermark level, transistor 1012 closes/turns on and the energy is transferred. In one embodiment, through the selection of high gate-threshold transistors, the voltage can build up fairly high in reservoir 1003 (as much as 1-2V) before the transistor 1012 closes/turns on. Transistor 1012 closes/turns on automatically when the gate threshold of the transistor design is reached in reservoir 1003. As soon as transistor 1012 closes/turns on, the energy is transferred from reservoir 1003 into reservoir 1004, thus depleting the energy in reservoir 1003, and the gate threshold falls below the watermark level and the transistor 1012 closes/opens again. The process then repeats when the voltage in reservoir 1003 becomes sufficiently high.

Note that transistor 1011 and 1012 may be replaced with other types of switches.

Waveform Aware Harvesting

In one embodiment, the RF waveform harvester comprises a RF to DC converter that is optimized for use with non-continuous wave (CW) signals. In another embodiment, the RF waveform harvesters are waveform aware and are able to perform ambient energy harvesting based on a waveform model, where the available RF energy is in the form of communication waveforms of a variety of types. Examples of commonly-harvested ambient RF energy sources with non-continuous wave signals include, but are not limited to, digital television (DTV) broadcasts, cellular base station transmissions (e.g., GSM, Code Division Multiple Access (CDMA)), Wi-Fi transmissions, etc.

For example, in one embodiment, WiFi is the communications waveform that is the ambient form of energy to be harvested. WiFi is bursty and has low amplitude compared to other sources of energy, where a bursty signal has a high peak to average ratio over ms to s time scale. For example, some WiFi signals have WiFi transmission burst times on the order of 1 ms. For a bursty signal, the harvester can only contribute energy to the reservoir capacitor ($C_x$) when the ambient source is transmitting.

Figure 11:
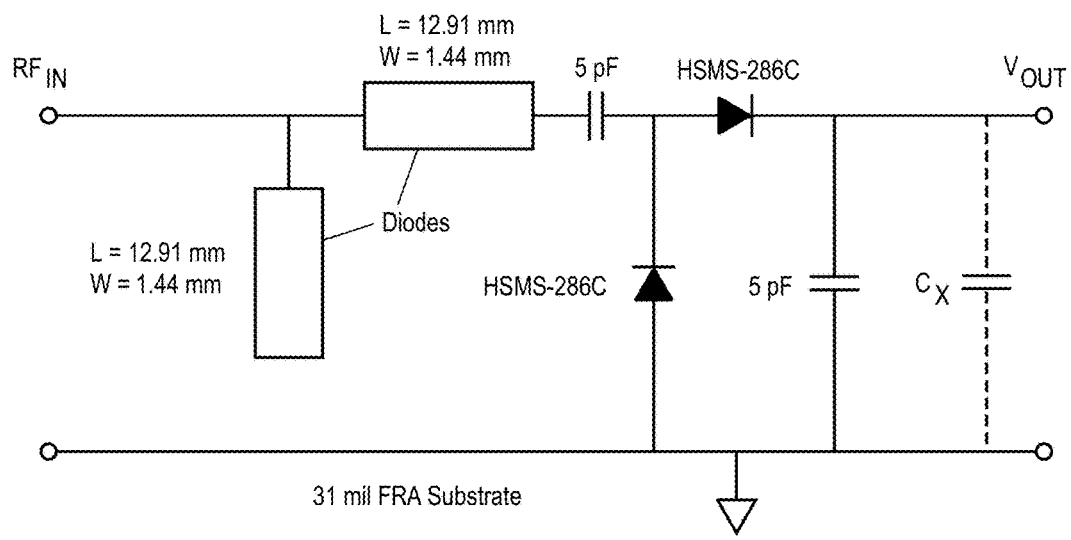
FIG. 11 illustrates a diode-based harvester schematic.

FIG. 11 illustrates a diode-based harvester schematic. Referring to FIG. 11, in one embodiment, the harvester is designed to be well matched at input power levels below −20 dBm where the majority of ambient Wi-Fi signals are expected to fall. Thus, harvester is characterized both in terms of its input match from 2.4 GHz to 2.5 GHz, as well as for harvesting efficiency at its maximum power point (MPP). Harvesting efficiency is defined as the ratio of input RF power at the harvester to harvested DC power at the load ($\eta$=PDC/PRF).

The purpose of capacitor $C_X$ in FIG. 11 is to store charge for any subsequent active electronic circuitry. In one embodiment, typical circuit power-up threshold voltages $V_{TH}$ equals 0.8 V, as is typical for CMOS logic in commodity processes. In another embodiment, the power-up threshold voltages $V_{TH}$ equals 50 mV, as is typical for ultra-low startup voltage boost converters using JFETs. Alternatively, specially doped CMOS transistors, floating gate devices, or Silicon on Insulator (SOI) transistors may be capable of operation down to voltages approaching $V_{TH}$=50-100 mV as well.

If the usable energy is defined as the portion of the stored energy above some threshold voltage $V_{TH}$, the following describes how to find a value of $C_X$ given the ambient RF input power and the signal's duty cycle. This is based on the maximum power point curve for the harvester, the typical burst timings for the ambient signal of interest (e.g., WiFi with some traffic model), and a time domain response for the harvester as a function of $C_X$. Thus, in one embodiment, the storage capacitor selection $C_X$ is optimized on the time scale of network traffic for the signal being harvested.

Figure 12:
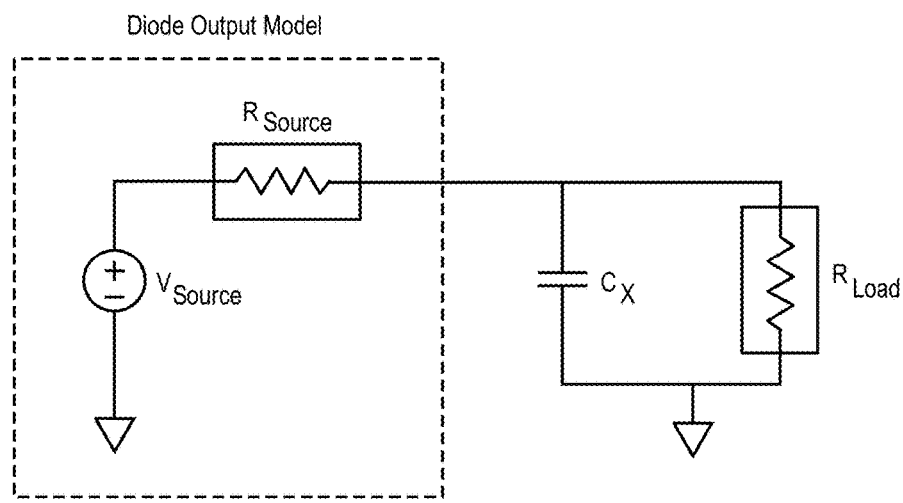
FIG. 12 illustrates a diode output circuit model.

FIG. 12 illustrates a diode output circuit model. Because the diode is a nonlinear device, the power delivered to the load varies dramatically with load impedance. The Maximum Power Point Tracking (MPPT) circuit functions as a load impedance converter to maximize the power delivered to the load, given a particular nonlinear operating point.

Referring to FIG. 12, the diode output model consists of an open-circuit voltage $V_{source}$ along with a nonlinear source resistance $R_{source}$. The pair, $V_{source}$, $R_{source}$, represents a fixed operating point at maximum power-point (MPP). The load resistance $R_{load}$ includes any leakage currents in $C_X$ as well as the quiescent current of the active circuitry attached to the harvester. In other words, the load impedance $R_{load}$ is chosen a priori based on the MPP of the harvester at a given ambient signal level (the maximum power point of the harvester given the input power). Using this model, only the effect of varying $C_X$ (not other system conditions) is considered.

Figure 13A:
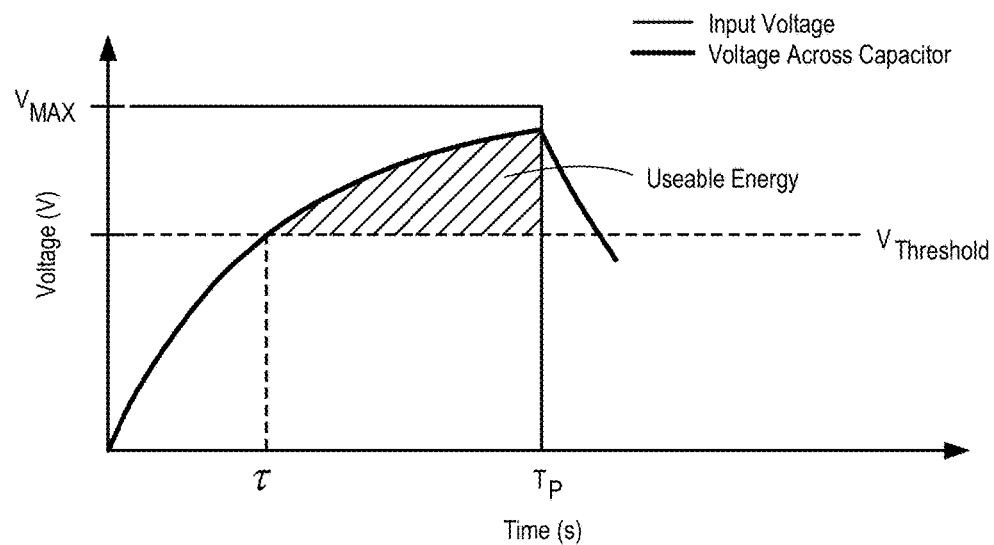
FIG. 13A illustrates the usable energy stored in capacitor $C_X$ during one transmission burse of duration $T_p$.

FIG. 13A illustrates the usable energy stored in capacitor $C_X$ during one transmission burse of duration $T_p$. Referring to FIG. 13A, the usable energy in $C_X$ is represented as the shaded portion of the curve above the voltage threshold and below the voltage across the capacitor.

Figure 13B:
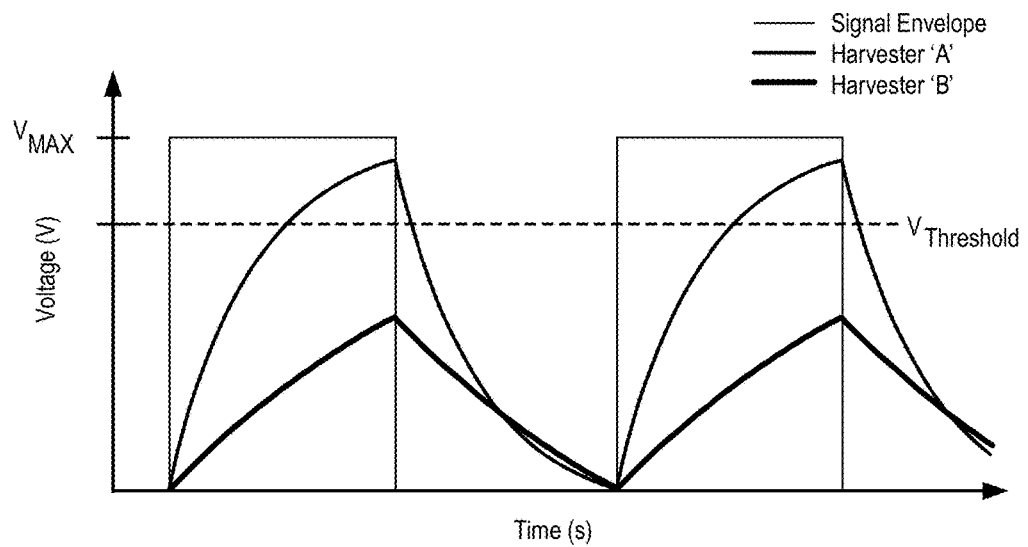
FIG. 13B illustrates examples of good and bad choices of $C_X$.

FIG. 13B illustrates examples of good and bad choices of $C_X$. If $C_X$ is too large, the active circuitry will never be powered because the input energy is insufficient to generate voltage above the threshold. On the other hand, if $C_X$ is minimized, little energy will be stored in the reservoir $C_X$ and the runtime of the active circuitry will not extend beyond the transmission intervals of the RF source. Referring to FIG. 13, harvesters 'A' and 'B' represent different choices for $C_X$ with the same conditions otherwise. In harvester A, $C_X$ looks appropriate as the output voltage exceeds $V_{TH}$ during each burst, while in harvester B, $C_X$ is too big and the output voltage never exceeds $V_{TH}$ so there is no usable energy.

An expression is derived for the useful-energy-maximizing reservoir capacitance $C_X$ as a function of ambient RF signal duty cycle and the load impedance RL at a diode harvester's maximum power point. The expression may be used to calculate the usable energy as a function of the known parameters and the unknown capacitance $C_X$.

The total energy in $C_x$ may be expressed as follows:

$$E = \tfrac{1}{2} C V^2$$

where C is the capacitance and V is the terminal voltage of $C_X$. It is assumed that the energy stored on the capacitor is only usable when the capacitor voltage is above the desired threshold $V_{TH}$. The usable energy is thus the difference between the stored energy at the end of an RF transmission (at time t=$T_p$) and the stored energy when $C_X$ is charged only to $V_{TH}$ and is expressed as follows:

$$E_{usable} = \tfrac{1}{2} C [V_{T_p}^2 - V_{th}^2]$$

where $V_{T_p}$ is the terminal voltage on $C_X$ at the end of an RF transmission (e.g., at the end of each burst) of duration $T_p$ and is expressed as:

$$V_{T_p} = V_{src}(1-e^{-T_p/RLC})$$

By substitution, the equation for the usable energy may be re-written in terms of C and the known values of $R_L$, $V_{TH}$ and $T_p$ as follows:

$$E_{usable} = \frac{1}{2}CV_{T_p}^2 \left[ e^{-\frac{2T_p}{R_LC}} - 2e^{-\frac{T_p}{R_LC}} + \left(1 - \left(\frac{V_{th}}{V_{T_p}}\right)^2\right) \right]$$

The equation may be solved for $E_{usable}$ as a function of $C_X$.

Thus, a new class of RF energy harvesters, referred to herein as waveform aware harvesters, have been described. These RF energy harvesters are RF to DC converters that are optimized for their performance with non-CW signals.

A Rectenna Embodiment

In one embodiment, the antenna the RF rectifier of the RF energy harvester are combined together to form a rectenna. In one embodiment, the antenna is a dual-linear polarized wideband probe fed air dielectric circular patch antenna, that is composed of two layers of double-sided printed circuit substrate. The front PCB carries the circular patch itself, implemented on the top and bottom layers of the front PCB. The back PCB serves as the ground plane for the patch antenna and also carries dual RF rectifiers, one for each polarization. The back PCB also carries the DC power management circuitry. In one embodiment, the circular patch itself is 59 mm diameter on a 100 mm2 board. The boards are separated by 5 mm aluminum spacers, which serve as probe feeds to the air dielectric patch. An advantage of this antenna design is that both horizontal and vertical polarized energy is captured by a single antenna and made available to two rectifiers without the power combining loss typical of a single feedpoint, circularly polarized antenna. Another advantage of the probe-fed design is that the center of the patch is at DC ground to reduce, and potentially minimize, ESD damage to the fragile RF diodes. In one embodiment, the antenna is fabricated on 0.031" thick, double sided Rogers 4003 substrate material. In one embodiment, the rectenna includes rectifying diodes. In one embodiment, the rectifying diodes are HSMS-286C RF detector diodes from Avago and are used in the single stage voltage doubler configuration, with separate rectifiers on each of the two feedpoints of the antenna. In one embodiment, a microstrip matching networks are used instead of lumped L- and C-elements to increase, and potentially maximize, element Q.

DC-DC Boost Converter Embodiments

FIG. 14A is a circuit schematic of one embodiment of a DC-DC boost converter. In one embodiment, the boost converter receives a negative voltage as an input, and switches the current through the transformer via a p-channel JFET in order to produce a positively-biased boosted voltage output.

The boost converter includes an input capacitor which is the same as the capacitor of the first DC reservoir (e.g., reservoir 902 of FIG. 9, initial reservoir capacitor 1002 of FIG. 10). In another embodiment, there is an output capacitor after the boost converter. This capacitor can be the same as the capacitor that is used as the charger input capacitor. The relative values of the capacitors are selected so that conservation of energy holds because an output capacitor that is too small will lose energy, but one that is too large will result in limited boosted voltage output. A 1000:1 ratio of capacitances is a good "rule of thumb" to apply, though other ratios may be used.

In one embodiment, in order to start the boost converter, it is necessary to allow at least 40-50 mV to build up across the input capacitor before adding the boost converter load (e.g., before allowing the boost converter to output its boosted voltage output). A pushbutton switch is an easy way of meeting this need according to one embodiment. In alternative embodiments, a dedicated circuit element is used in place of the push button. For example, an ultra-low power comparator (e.g., operational amplifier), an ultra low-power relay, or a momentary switch (e.g., a rocker switch) can be used to hold off the boost converter until sufficient energy is stored in the rectifier capacitor.

Referring to FIG. 14A, boost converter 1400 comprises an input 1401 and an output 1408. In one embodiment, input 1401 is a rectified RF input. In one embodiment, the rectified RF input is a negative voltage that is produced by a rectifier (not shown in FIG. 14A to avoid obscuring the present invention) in which diodes are reversed in their position (flipped upside down) so that their conducting ground is to the negative voltage (instead of ground to positive).

Input 1401 is connected to a capacitor 1402 and a push button 1403. Capacitor 1402 is connected between input 1401 and ground. In one embodiment, capacitor 1402 is a 100 µf capacitor.

Push button 1403 is also coupled to a first winding of transformer 1404. In one embodiment, transformer 1404 is a Coilcraft LPR6235 transformer with 1:20 turns ratio. In one embodiment, the turns ratio is increased from 1:20 to 1:50, which increases the gain of the booster without introducing unacceptable losses. The other end of the first winding of transformer 1404 is connected to a drain of p-channel junction field-effect transistor (JFET) 1405. The source of transistor 1405 is connected to ground. The gate of transistor 1405 is connected to an end of the second winding of transformer 1404. In one embodiment, the gate of transistor 1405 is also coupled to capacitor 1406, which is also connected to ground. Note that capacitor 1406 is optional. In one embodiment, capacitor 1406 is a 100 pF capacitor. In one embodiment, transistor 1405 is a MMBJF201 transistor from Fairchild Semiconductor.

The other end of the second winding of transformer 1404 is connected to output 1408. Output 1408 is also connected to capacitor 1407, which is also connected to ground. In one embodiment, capacitor 1407 is a 0.1 µF capacitor. That is, capacitor 1407 is 1/1000th of capacitor 1406.

In operation, at first, when the RF rectified input voltage is received, it charges up capacitor 1402. At this point, while charging up capacitor 1402, there is no current flowing through the first winding of transformer 1404 or through transistor 1405 as transistor 1405 is off.

When the charge on capacitor 1402 reaches a predetermined level, push button 1403 is activated and current starts to flow through the first winding of transformer 1404. In one embodiment, the booster begins to function when as low as 50 mV is available on capacitor 1402, so push button 1403 can be pressed at any time after the 50 mV point. Of course, the greater the voltage on capacitor 1402, the greater the boosted voltage output on capacitor 1407.

Once push button 1403 is pushed, the voltage of the first winding of transformer 1404 is transformed into a higher voltage on the second winding of transformer 1404. Capacitor 1407 and transformer 1404 form an LC resonant circuit. With ideal inductors and diodes, the magnetic field of the inductor is transferred to the electric field of the capacitor, and then back again. This would resonate indefinitely in an ideal case, building up voltage on capacitor 1407, provided there is enough startup energy in capacitor 1402. Also, in one embodiment, since the rectified input voltage is negative, the voltage at capacitor 1406 is positive.

But no actual electronic circuits are ideal; there are always losses. Therefore, eventually, the charge stored in capacitor 1402 depletes due to the transfer of boosted voltage energy into capacitor 1407, through transformer 1404 and the charging of capacitor 1407. At this point, the LC resonant oscillations stop, push button 1403 is closed, and capacitor 1402 returns to storing charge. Thereafter the process of storing and transferring charge repeats in the future. In one embodiment, the oscillations are on the order of 100 KHz, and they self resonate for 200-300 msec.

FIG. 14B is a circuit schematic of an alternative embodiment of a DC-DC boost converter. In one embodiment, the boost converter receives a negative voltage as an input, and switches the current through the transformer via a p-channel JFET in order to produce a positively-biased boosted voltage output.

The boost converter includes a pair of input capacitors 1412A-1412B which in one embodiment represents the capacitor of the first DC reservoir (e.g., reservoir 902 of FIG. 9, initial reservoir capacitor 1002 of FIG. 10). In one embodiment, each of capacitors 1412A and 1412B is a 330 µF capacitor. In one embodiment, the capacitance of capacitors 1412A and 1412B is a large capacitance (e.g., greater than 100 µF). In one embodiment, the capacitance is increased from 100 µF to 660 µF, which increases the stored energy in a reasonable time frame. Note that the capacitance of capacitors 1412A and 1412B is about 6× the size of the input capacitor in FIG. 14A. In another embodiment, there is an output capacitor after the boost converter. This capacitor can be the same as the capacitor that is used as the charger input capacitor.

Referring to FIG. 14B, the boost converter comprises an input 1411 and an output 1418. In one embodiment, input 1411 is a rectified RF input. In one embodiment, the rectified RF input is a negative voltage that is produced by a rectifier (not shown in FIG. 14B to avoid obscuring the present invention) in which diodes are reversed in their position (flipped upside down) so that their conducting ground is to the negative voltage (instead of ground to positive).

Input 1411 is connected to a capacitors 1412A and 1412B and a push button 1413. Capacitors 1412A and 1412B are connected between input 1411 and ground.

Push button 1413 is also coupled to a first winding of transformer 1414. In one embodiment, transformer 1414 is a Coilcraft LPR6235 transformer with 1:50 turns ratio, which provides a higher multiplier than the transformer 1404 in FIG. 14A. The other end of the first winding of transformer 1414 is connected to a drain of p-channel junction field-effect transistor (JFET) 1415. The source of transistor 1415 is connected to ground. The gate of transistor 1415 is connected to an end of the second winding of transformer 1414. In one embodiment, the gate of transistor 1415 is also coupled to capacitor 1416, which is also connected to ground. Note that capacitor 1416 is optional. In one embodiment; capacitor 1416 is a 2 pF capacitor. In one embodiment, transistor 1415 is a MMBFJ720 transistor from Fairchild Semiconductor®.

The other end of the second winding of transformer 1414 is connected to output 1418. Output 1418 is also connected to capacitor 1417, which is also connected to ground. In one embodiment, capacitor 1417 is a 0.1 µF capacitor.

The detailed functionality of FIG. 14B is identical to that of FIG. 14A, so that description will not be repeated here, but the performance, due to the component value changes, is more efficient in FIG. 14B than 14A.

A Battery Charger Embodiment

In one embodiment, a battery charger is included to charge a rechargeable storage device. In one embodiment, the rechargeable storage device is a rechargeable battery. In one embodiment, where voltages are commonly less than 2V, a Nickel Metal Hydride (NiMH) battery is used as the rechargeable battery. NiMH batteries discharge at 1.5V and can be trickle-charged indefinitely, without concern for overcurrent or overcharging, at around 2.3V. Alternatively, a lithium battery can be used but is not ideal, because energy is lost both on boosting up to their terminal voltage, as well as regulating back down (assuming the sensor electronics are running at a nominal 1.8V or even lower) for the load. Thus, a battery charging system designed for NiMH batteries are therefore more efficient than lithium under these operating conditions.

It is assumed that the input energy is limited (Wi-Fi harvesting), so that the battery is not at risk of charging at a rate greater than one tenth of its capacity in mAh (called the C/10 rate). With a small 1.8 mAh button-cell-like battery, the charging current is less than 180 uA/hour.

In one embodiment, the battery charger includes an array, or group, of transistors to allow for the boost converter to build up the voltage to the charging circuit. Once the voltage has been built up, the energy is gated into the battery. In one embodiment, the gating is performed using a n-channel MOSFET. Thereafter, the cycle of waiting while the voltage builds up and then gating energy into the battery, which depletes the voltage build up, repeats all over again.

Similarly, the battery charger includes a number of diodes used can be selected to ensure the appropriate voltage build-up. For example, in one embodiment, the battery charger includes a pair of diodes, the cathode of the second which controls the gate of the first transistor in the array of transistors, and the pair of diodes connected into the gate of the first transistor are sized to ensure an appropriate voltage buildup after the boost converter. The number of diodes used determines the amount of voltage build-up, as a typical diode forward voltage drop is 1.4V. In FIG. 15A, a voltage of 1.4V is implemented.

In one embodiment, a diode is connected in series with the charging path (e.g., from the input of the battery charger to the positive terminal of the battery) to prevent back current from the battery to flow into the charge-detection circuitry (which may be part of the battery charger or may be part of a DC/DC boost converter). A final gate (e.g., a MOSFET) connects the battery ground to the charger ground, thus allowing current flow into the battery. Alternatively, p-channel MOSFET can be used to switch the power into the battery.

Thus, in one embodiment, the novel charger design is optimized to the needs of a NiMH charging system, enabling trickle-charging without requiring a complex charge management system as is typical for lithium or lithium polymer batteries.

Because a NiMH battery is used, there is no need for a down converter on the load nor a charge counter that is used with Lithium batteries to count the amount of energy that has been stored.

FIG. 15A is a circuit schematic of one embodiment of a battery charger. Referring to FIG. 15A, battery input 1501 is connected to the input of diode 1502 and a pair of cascade connected diodes 1503 and 1504. The cathode of diode 1502 is connected to the positive ("+") terminal of battery 1520.

The cathode of diode 1504 is connected to capacitor 1505, which is connected to ground. In one embodiment, capacitor 1505 is a 0.01 uF capacitor. The input of diode 1506 is connected ground and the output of diode 1506 is connected to a node connecting the output of diode 1504 and capacitor 1505.

The gate of transistor 1507 is also connected to the node connecting the output of diode 1504 and capacitor 1505. In one embodiment, transistor 1507 is a n-channel MOS field-effect transistor. The source of transistor 1507 is connected to ground, while the drain of transistor 1507 is connected to one end of resistors 1508 and 1509. In one embodiment, resistors 1508 and 1509 are 10 K Ohm and 100 K Ohm, respectively.

The other end of resistor 1508 is connected to the + terminal of battery 1520, forming a self-powered pull-up resistor. The other end of resistor 1509 is connected to capacitor 1513, which is also connected to ground, and the gate of transistor 1510. In one embodiment, transistor 1510 is an n-channel MOS field-effect transistor (MOSFET). In one embodiment, capacitor 1513 is a 0.1 uF capacitor. Resistor 1509 and capacitor 1513 form an RC time delay circuit, allowing further build-up of energy before charging the battery.

The source of transistor 1510 is connected to ground while its drain is connected to one end of resistor 1511 and the gate of transistor 1512. In one embodiment, resistor 1511 is 10 K Ohm. The other side of resistor 1511 is connected to the + terminal of battery 1520, again forming a pull-up resistor. The source of transistor 1512 is connected to ground while its drain is connected to the negative ("−"), or ground, terminal of battery 1520.

In operation, the connection to battery 1520 is normally an open circuit. The connection to battery 1520 is made when a charge pulse is to be stored in battery 1520. The negative terminal of battery 1520 is connected to ground when transistor 1512 is turned on.

Transistors 1507 and 1510, in combination with diodes 1503 and 1504, are used to hold off and wait for the voltage to reach a particular level before putting the voltage into energy storage. Diodes 1503 and 1504 force two diode drops onto the gate of transistor 1507. When the voltage is high enough, transistor 1507 turns on. Once transistor 1507 turns on, there is a predetermined period of time before transistor 1510 turns on. This is due to the RC time constant associated with the RC circuit consisting of resistor 1509 and capacitor 1513. Once transistor 1510 turns on, then transistor 1512 turns on, thereby causing the battery to charge.

When the voltage on the input from the boost converter drops to a level at which transistor 1507 turns off, because the energy has been transferred into the battery, then transistor 1510 turns off after the delay due to the RC circuit, thereby causing transistor 1512 to turn off. At this point, the charging of battery 1520 stops.

Note that transistor 1510 acts an inversion transistor to change the polarity of the signal on the gate of transistor 1512, so that it turns on with the appropriate polarity. Note that some of the energy stored in capacitor 1505 is used to turn on the gate of transistor 1507.

Pull-up resistors 1509 and 1511 are used to control the gates of transistors 1510 and 1512 respectively. Specifically, these resistors provide a defined logic level for the gates of transistors 1507 and 1510 off when the voltage level at the input of the boost converter drops to a particular level.

Diode 1506 is used for stabilization by bring stability to the gate of transistor 1507 to compensate for oscillation that occurs on the node connecting the output of diode 1504 and the gate of transistor 1507, and it also prevents over-voltage build-up on that node.

Diode 1502 is connected in series between input 1501 and the + terminal of battery 1520 to prevent back current from the battery to flow in the opposite direction.

FIG. 15B is a circuit schematic of an alternative embodiment of a battery charger for a similar type of battery system as FIG. 14B. The battery charger of FIG. 15B uses p-channel MOSFETs to switch energy directly into the battery terminal, as well as high-switching speed n-channel MOSFETs in the control section to reduce leakage during the gate transition range because of slow edge rates.

Referring to FIG. 15B, the battery charger includes a battery charger input 1530, a battery charger output at battery 1534, transistors 1531-1533, 1536 and 1537, capacitors 1541, 1542 and 1551, and resistors 1561-1565. Transistor 1536 is directly in parallel with transistor 1532, and transistor 1573 is directly in parallel with transistor 1533. In one embodiment, transistors 1532 and 1533 are used and 1536 and 1537 are not used. In another embodiment, these can be reversed. The difference here is different packages for different types of transistors. Transistors 1536 and 1537 are 3-pin parts, while 1532 and 1533 are 8-pin parts. In the discussion that follows, transistors 1532 and 1533 will be used.

Battery charger input 1530 is coupled to the positive ("+") terminal of the battery at battery charger output 1534 via transistors 1532 and 1533. In operation, the connection to the battery at battery 1534 is normally not connected. The connection to battery 1534 is made when a charge pulse is to be stored in the battery. The positive terminal of the battery 1534 is connected to the charged energy at input 1530. When p-channel MOSFET transistors 1532 and 1533 are on, energy flows into the battery.

Battery charger input 1530 is also connected to the gate input of transistor 1531. Transistor chip 1531 is a sub-threshold n-channel MOSFET chip that includes a pair of n-channel transistors. The first of these transistors turns on when the voltage on its gate input (GN1) is at or above a predetermined level. In one embodiment, transistor 1531 is an ALD110914 transistor from Advanced Linear Devices that turns on when the voltage on its gate is 1.4 v.

When the first of the transistors of transistor chip 1531 turns on, its drain output (DN1) is pulled down (because it is now conducting to the source S12 which is ground). The drain output DN1 of the first transistor in transistor chip 1531 is coupled to the gate of transistor 1532, and because transistor 1532 is a p-channel mosfet, when its gate is low, transistor 1532 turns on. When transistor 1532 turns on, the voltage from battery charger input 1530 passes through transistor 1532 and causes a signal from feedback 1570, which is coupled to the gate input (GN2) of the second transistor of transistor chip 1531, to be received by the gate input GN2 and after a delay the voltage reaches high enough to turn on that second transistor.

When the second of the transistors of transistor chip 1531 turns on, its drain output (DN2) is pulled down (because it is now conducting to the source S12 which is ground). The drain output DN2 of the second transistor in transistor chip 1531 is coupled to the gate of transistor 1533 and similarly to transistor 1532, because transistor 1533 is a p-channel mosfet, when its gate is low, transistor 1533 turns on. At this point, since both transistors 1532 and 1533 are on, the voltage from battery charger input 1530 charges the battery 1534.

Thus, the voltage from battery charger input 1530 controls transistor chip 1531, which in turn controls transistors 1532 and 1533, to cause the battery at battery output 1534 to be charged.

Resistors 1561 and 1562 are pull-up resistors that are designed to provide a bias to the drains of both transistors in 1531, to keep transistors 1532 and 1533 off while the drain outputs DN1 and DN2, respectively, are high (because the two transistors in transistor chip 1531 are off).

Resistor 1563 is used to weakly discharge any remaining voltage on battery charger input 1530 when the booster circuit (e.g., FIG. 14A, FIG. 14B, etc.) is not outputting a voltage into battery charger input 1530, to prevent a brown-out startup condition in the booster circuit.

In one embodiment, resistors 1564 and 1565 are 0-ohm resistors and are direct electrical shorts. Their presence allows for easy access to probe and debug the charger circuit, but they are not required.

Capacitor 1551 is coupled to the output to provide DC stability. In one embodiment, capacitor 1551 is a 150 pF capacitor.

Capacitors 1540 and 1541 are used to adjust the timing of when the gates of transistors 1532 and 1533 are at a low enough voltage to turn on by slowing down their falling edge. This is because the pull-up transistors 1561 and 1562 in combination with the voltage source VBAT cause capacitors 1540 and 1541 to be charged up at the time when the transistors of transistor chip 1531 turn on. This charge will drain slowly and the delay caused by the draining of these capacitors allows more energy to build up prior to transistors 1532 and 1533 from both being turned on. In one embodiment, capacitor 1540 is a 0.001 µF capacitor, and capacitor 1541 is a 0.1 µF capacitor.

Diode 1580 is used to prevent current backflow from the battery into the charger circuit when the circuit is idle (i.e., when waiting for harvested energy to build up before the booster circuit).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network sensor system comprising:
   a radio-frequency (RF) emitter;
   a first sensor tag including
      a transmitter,
      an energy harvesting unit operable to convert incident RF energy to direct current (DC) including RF energy from the RF emitter and RF energy from one or more ambient sources,
      a storage unit operable to store recovered DC power,
      one or more sensors for sensing and logging data,
      a controller coupled to the energy harvesting and storage units, the one or more sensors and the transmitter, to communicate data in the form of a Bluetooth Low Energy (BLE) advertising packet using energy previously harvested and stored by the energy harvesting and storage unit; and
   a first device to receive the BLE advertising packet, the first device being operable to determine whether the first sensor tag is to perform a transmit operation or is not to perform a transmit operation, and to cause a message to be transmitted to the first sensor tag based on results of determining whether the first sensor tag is to perform the transmit operation, wherein the first device is operable to determine whether the first sensor tag is to perform the transmit operation based on charge rate of the first sensor tag, an amount of energy necessary for the first sensor tag to complete the transmit operation, and an amount of time necessary for the first sensor tag to complete the transmit operation,
   wherein the first sensor tag is operable to determine a charge energy for each of a plurality of frequencies transmitted from the RF emitter executing a sweep algorithm and identifies one of the plurality of frequencies as one frequency that produced more charge energy than any other of frequencies of the plurality of frequencies, and
   wherein the BLE advertising packet includes the identified one frequency.

2. The system defined in claim 1 wherein the RF emitter is operable to perform the sweep algorithm in which the RF emitter transmits RF energy at a plurality of frequencies to enable determination of which frequency among the plurality of frequencies provides a greatest power transfer efficiency (PTE) for the first sensor tag.

3. The system defined in claim 2 wherein the PTE for the first sensor tag is based on the charge energy at the one frequency and the received signal strength of the BLE advertising packet from the first sensor tag.

4. The system defined in claim 2 wherein the first device is operable to transmit a wakeup indication to the first sensor tag at a time associated with a start of the sweep algorithm to enable the first sensor tag to synchronize with the RF emitter when the RF emitter performs the sweep algorithm.

5. The system defined in claim 1 wherein the first sensor tag includes first, second and third modes of operation, wherein
   in the first mode, in response to a first pulse, the first sensor tag transmits identification information,
   in the second mode, in response to a second pulse, the first sensor tag receives a notification that the first sensor tag is to provide information to the first device without having to turn on its receiver for receiving the plurality of frequencies transmitted by the RF emitter, and
   in the third mode, in response to a third pulse, the first sensor tag receives a notification that the first sensor tag is to provide information to the first device and turn on its receiver for receiving the plurality of frequencies transmitted by the RF emitter.

6. The system defined in claim 1 wherein the BLE advertising packet contains ID information.

7. The system defined in claim 1 wherein the BLE advertising packet contains one or more sensor readings from the one or more sensors.

8. The system defined in claim 1 wherein the first device comprises a smart phone or an internet gateway.

9. The system defined in claim 1 wherein the first device converts the BLE advertising packet to a message for transmission over the Internet.

10. A sensor tag for use in a sensor system, the sensor tag comprising:
    a transmitter;
    an energy harvesting unit operable to convert incident RF energy to direct current (DC) including RF energy from a RF emitter and RF energy from one or more ambient sources;
    a storage unit operable to store recovered DC power;
    one or more sensors for sensing and logging data;
    a controller coupled to the energy harvesting and storage units, the one or more sensors and the transmitter, to communicate data from in the form of a Bluetooth Low Energy (BLE) advertising packet using energy previously harvested and stored by the energy harvesting and storage unit, wherein the sensor tag determines the charge energy for each of a plurality of frequencies transmitted from the RF emitter executing a sweep algorithm and identifies one of the plurality of frequencies as one frequency that produced more charge energy than any other of frequencies of the plurality of frequencies, and wherein the BLE advertising packet includes the identified one frequency, and wherein a first device is operable to determine whether the sensor tag is to perform a transmit operation or is not to perform a transmit operation, and to cause a message to be transmitted to the sensor tag based on results of determining whether the sensor tag is to perform the transmit operation, wherein the controller controls the sensor tag in first, second and third modes of operation, wherein in the first mode, in response to a first pulse, a radio transmits identification information, in the second mode, in response to a second pulse, the radio transmits information without having to turn on its receiver for receiving the plurality of frequencies transmitted by the RF emitter, and in the third mode, in response to a third pulse, the radio transmits information and turns on its receiver for receiving the plurality of frequencies transmitted by the RF emitter.

11. The sensor tag defined in claim 10 wherein the sensor tag receives a wakeup indication to synchronize itself with the RF emitter when the RF emitter performs the sweep algorithm.

12. The sensor tag defined in claim 10 wherein the BLE advertising packet contains ID information.

13. The sensor tag defined in claim 10 wherein the BLE advertising packet contains one or more sensor readings from the one or more sensors.

14. A method for use in a sensor system having a tag, an RF emitter and a device, the method comprising:

performing, by the RF emitter, a sweep algorithm in which the RF emitter transmits RF energy at a plurality of frequencies;

determining, by the tag, charge energy for each of the plurality of frequencies;

identifying, by the tag, one of the plurality of frequencies as one frequency that produced more charge energy than any other of frequencies of the plurality of frequencies;

transmitting, by the tag, communication data in the form of a Bluetooth Low Energy (BLE) advertising packet including the identified one frequency;

determining which frequency among the plurality of frequencies provides a greatest power transfer efficiency (PTE) for the tag;

determining, by the device, whether the tag is to perform a transmit operation or is not to perform a transmit operation, including determining, by the device, whether the tag is to perform the transmit operation based on charge rate of the tag, an amount of energy necessary for the tag to complete the operation, and an amount of time necessary for the tag to complete the operation; and sending an indication to the tag based on results of determining whether the tag is to perform the transmit operation.

15. The method defined in claim 14 wherein the PTE for the tag is based on the charge energy at the one frequency and the received signal strength of the BLE advertising packet from the tag.

16. The method defined in claim 14 further comprising transmitting, by the device, a wakeup indication to the tag at a time associated with a start of the sweep algorithm to enable the tag to synchronize with the RF emitter when the RF emitter performs the sweep algorithm.

* * * * *